US011407423B2

(12) United States Patent
Liu et al.

(10) Patent No.: US 11,407,423 B2
(45) Date of Patent: Aug. 9, 2022

(54) EGO ACTIONS IN RESPONSE TO MISBEHAVING VEHICLE IDENTIFICATION

(71) Applicant: Intel Corporation, Santa Clara, CA (US)

(72) Inventors: Xiruo Liu, Portland, OR (US);
Liuyang Yang, Portland, OR (US);
Manoj Sastry, Portland, OR (US);
Marcio Juliato, Portland, OR (US);
Shabbir Ahmed, Beaverton, OR (US);
Christopher Gutierrez, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/727,785

(22) Filed: Dec. 26, 2019

(65) Prior Publication Data

US 2020/0139980 A1    May 7, 2020

(51) Int. Cl.
| | |
|---|---|
| *B60W 50/00* | (2006.01) |
| *B60W 30/14* | (2006.01) |
| *B60W 30/12* | (2020.01) |
| *H04W 4/40* | (2018.01) |
| *B60W 30/09* | (2012.01) |

(52) U.S. Cl.
CPC ........ *B60W 50/0098* (2013.01); *B60W 30/09* (2013.01); *B60W 30/12* (2013.01); *B60W 30/14* (2013.01); *H04W 4/40* (2018.02); *B60W 2050/009* (2013.01); *B60W 2050/0075* (2013.01); *B60W 2556/45* (2020.02)

(58) Field of Classification Search
CPC .. B60W 50/0098; B60W 30/14; B60W 30/12; B60W 30/09; B60W 2050/009; B60W 2050/0077; B60W 2556/45; H04W 4/40; H04W 12/122; H04L 63/1408
See application file for complete search history.

(56) References Cited

U.S. PATENT DOCUMENTS

| | | | |
|---|---|---|---|
| 8,849,993 B2 * | 9/2014 | Cooper | H04L 41/22 709/224 |
| 2013/0278440 A1 * | 10/2013 | Rubin | G01C 21/3658 340/903 |

(Continued)

OTHER PUBLICATIONS

Survey on Misbehavior Detection (Year: 2018).*
Trust Management in Vehicular ad hoc network (Year: 2015).*

*Primary Examiner* — Jeff A Burke
*Assistant Examiner* — Kyle T Johnson
(74) *Attorney, Agent, or Firm* — KDB Firm PLLC

(57) ABSTRACT

Systems, apparatus, methods, and techniques for an ego vehicle to respond to detecting misbehaving information from remote vehicles are provided. An ego vehicle, in addition to reporting misbehaving vehicles to a misbehavior authority via a vehicle-to-anything communication network, can, take additional actions based in part on how confident the ego vehicle is about the evidence of misbehavior. Where the confidence is high the ego vehicle can simply discard the misbehaving data and provide an alternative estimate for such data from alternative sources. Where the confidence is not high the ego vehicle can request assistance from neighboring vehicles and roadside units to provide independent estimates of the data to increase confidence in the evidence of misbehavior.

25 Claims, 10 Drawing Sheets

(56) References Cited

U.S. PATENT DOCUMENTS

| | | |
|---|---|---|
| 2019/0068582 A1* | 2/2019 | Kim .................. G07C 5/008 |
| 2019/0068639 A1* | 2/2019 | Alexander ............ H04W 4/46 |
| 2019/0149610 A1* | 5/2019 | Jayaraman ............ B60R 25/24 |
| | | 713/155 |
| 2019/0197461 A1* | 6/2019 | Anderson ............ G06Q 50/20 |
| 2019/0200228 A1* | 6/2019 | Adrangi ................ H04W 8/24 |
| 2019/0258242 A1* | 8/2019 | Avery ............... G06K 9/00979 |
| 2019/0268367 A1* | 8/2019 | Willis ................ G06F 21/554 |
| 2019/0312738 A1* | 10/2019 | Barrett ............... H04W 12/088 |
| 2019/0312896 A1* | 10/2019 | Petit ................... H04L 63/1416 |
| 2019/0339082 A1* | 11/2019 | Doig ................... G06F 16/29 |
| 2019/0373609 A1* | 12/2019 | Kim .................... H04W 36/06 |
| 2020/0045552 A1* | 2/2020 | Kim ................... H04W 12/122 |
| 2020/0053111 A1* | 2/2020 | Jakobsson .............. H04L 51/12 |
| 2020/0139980 A1* | 5/2020 | Liu ................... H04W 12/122 |
| 2020/0280842 A1* | 9/2020 | Liu ................... H04W 12/009 |
| 2020/0413264 A1* | 12/2020 | Han ..................... H04W 12/68 |
| 2021/0067926 A1* | 3/2021 | Hwang ................ H04W 28/02 |
| 2021/0084461 A1* | 3/2021 | Kim .................... H04W 12/06 |
| 2021/0112417 A1* | 4/2021 | Geissler ............. H04W 12/104 |

* cited by examiner

US 11,407,423 B2

EGO ACTIONS IN RESPONSE TO MISBEHAVING VEHICLE IDENTIFICATION

TECHNICAL FIELD

Embodiments described herein generally relate to responding to detections of misbehavior of connected vehicles.

BACKGROUND

In vehicular networks, vehicles may be configured to communicate with other devices (e.g., other vehicles, roadside infrastructure, or the like). This is often referred to as vehicle-to-anything (V2X) communication. V2X communication can include vehicle-to-vehicle (V2V) communication and/or vehicle-to-infrastructure (V2I) communication. Vehicular networks (e.g., supporting V2X communication, or the like) may be multi-hop communication networks and may facilitate the communication of real-time traffic information (e.g., congestion, accidents, construction, etc.) and information associated with individual vehicles (e.g., speed, location, direction of travel, etc.) for various transportation-based use cases, such as accident avoidance and route optimization.

DETAILED DESCRIPTION

Various embodiments are generally directed to responding to detections of misbehavior of connected vehicles. Said differently, the present disclosure is directed towards to systems and methods for a vehicle (ego vehicle) to respond to detections of misbehavior of a connected vehicle (vehicle communicatively connected to the ego vehicle). During operation, vehicles communicate messages including indications of data (e.g., speed reports, direction reports, velocity changes, etc.) over a V2X network. The ego vehicle can determine (or predict) misbehavior of one of the connected vehicles based on the messages received over the V2X network. The present disclosure is directed towards actions of the ego vehicle, responsive to detection of a misbehavior of a connected vehicle.

For example, the present disclosure provides an ego vehicle arranged to score the determined misbehavior and respond to the determined misbehavior based on the score. As a specific example, the ego vehicle can discard the V2X message based on the determined misbehavior score. As another example, the ego vehicle can discard the V2X message and can estimate contents of the V2X message from other sources (e.g., other connected vehicles, roadside units, etc.).

With further examples, the present disclosure provides an ego vehicle arranged to determine a safety impact of the misbehaving vehicle and respond to the determined misbehavior based on the determined score and/or safety impact. In some examples, the ego vehicle can be arranged to repeatedly update the score and change a response pathways based on the updated score.

These and other examples are described in greater detail below. In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1A:
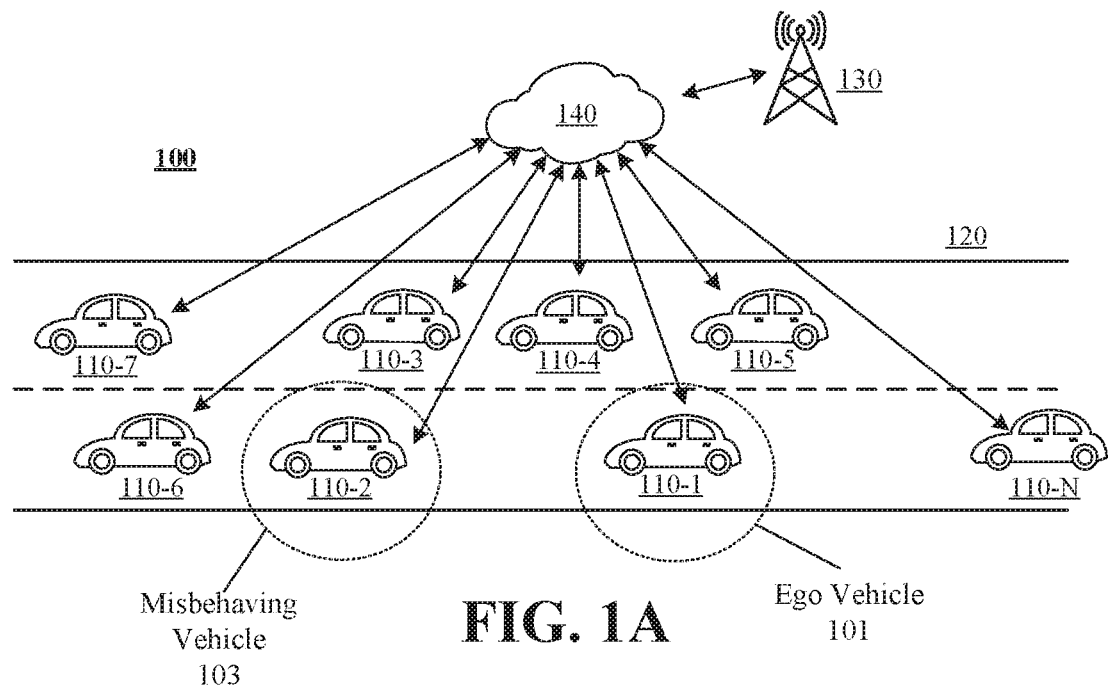
FIGS. 1A-1B illustrates a system of vehicles and roadside unit arranged to communicate in a V2X network.
Figure 1B:
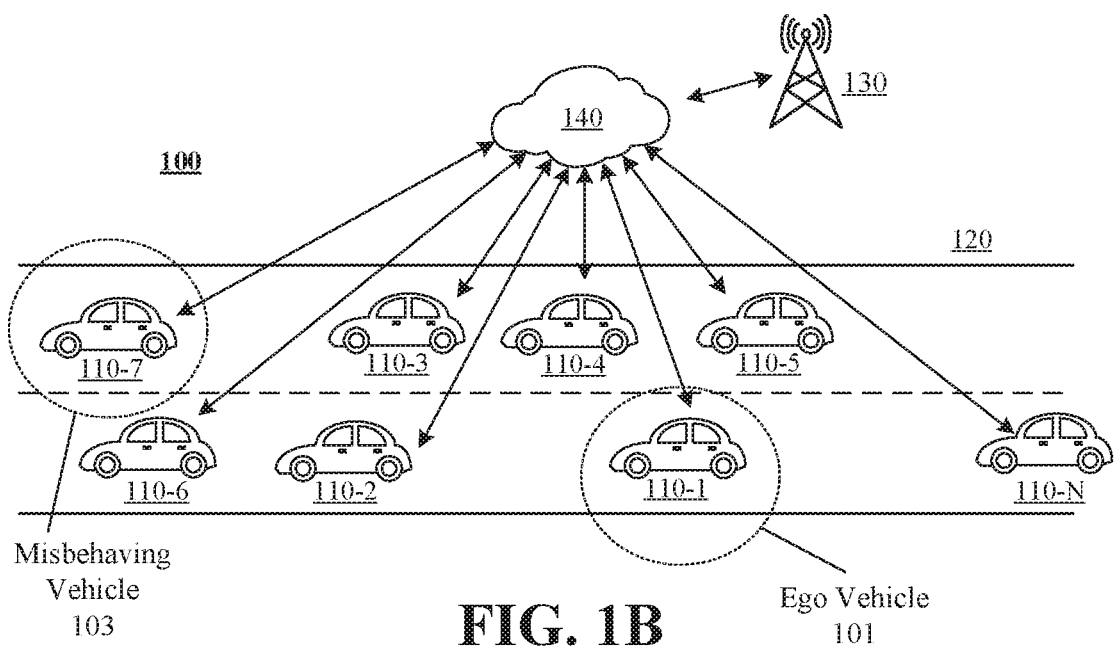

FIGS. 1A and 1B illustrate a system 100 including a number of connected vehicles 110 traveling on a roadway 120 with a roadside unit (RSU) 130 adjacent to the roadway 120. Although these figures illustrate the RSU 130 being arranged at a side of the roadway 120, it may be understood that the RSU 130 may be arranged anywhere (e.g., top, bottom, etc.) near the roadway 120 or in any fashion that allows the RSU 130 to communicate with the vehicles (and vice versa). Moreover, it may be understood that the vehicles connected to the vehicular network may not be limited to motor-based vehicles (e.g., gas, diesel, electric), but may be any suitable vehicle configured to perform V2X communication, such as railed vehicles (e.g., trains, trams), watercrafts (e.g., ships, boats), aircraft (airplanes, spaceships, satellites, etc.) and the like. Lastly, the RSU 130 may be mobile and not fixed as depicted.

Any number of vehicles 110 can travel of roadway 120, for example, vehicles 110-1, 110-2, 110-3, 110-4, 110-5, 110-6, 110-7 through 110-N are depicted. RSU 130 and vehicles 110 can include circuitry arranged to facilitate V2X communication. For example, these figures depict vehicles 110 communicatively coupled to RSU 130 via a V2X network 140. It is noted, that communication between vehicles 110 in system 100 can be facilitated by RSU 130 acting as a routing node, by V2X network 140 acting as a routing node, or by some other communication scheme, such as, DSRC (Dedicated Short Range Communication), cellular V2X, or multi-hop communication, or the like. Examples are not limited in this context.

During operation, vehicles 110 and/or RSU can be arranged to transmit (e.g., via V2X network 140, or the like) information elements comprising indications of data related to a vehicle 110 and/or travel on roadway 120. For example, vehicles 110 can transmit V2X messages including indications of data related to the vehicle 110. As a specific example, vehicle 110-2 can transmit a V2X message via V2X network 140 including indications of data (e.g., speed of vehicle 110-2, trajectory of vehicle 110-2, position of vehicle 110-2, acceleration of vehicle 110-2, etc.). Other vehicles 110 and/or RSU 130 can receive the V2X message transmitted by vehicle 110-2 via V2X network 140.

For example, vehicles 110 can be arranged to send and receive basic safety messages (BSM), cooperative awareness messages (CAM), decentralized environmental notification messages (DENM), or the like. Furthermore, vehicles 110 and RSU 130 can be arranged to operate in compliant with one or more standards. Said differently, vehicles 110 and RSU 130 can be arranged to send messages via V2X network where V2X network operates based on one or more standards. For example, the V2X communication schemes of the present disclosure, may be based on one or more communication standards, such as, for example, the 802.11p Dedicated Short Range Communications standard promulgated by the Institute of Electrical and Electronic Engineers (IEEE), cellular and long-term evolution (LTE) standards promulgated by the $3^{rd}$ Generation Partnership Project (3GPP). Additionally, the messages communicated via V2X networks may be based on one or more standards, such as, SAE J2735, which defines BSM, among other messages.

Furthermore, vehicles 110 can be arranged to determine a misbehavior of a connected vehicle based on received V2X messages, and to respond to the determined misbehavior. As used herein, the phrase "respond to the misbehavior" implies that the vehicle takes some action, implements some behavior, initiates a control flow, changes a setting, or the like. It is not intended to imply that the vehicle sends a response message via the V2X network.

As the present disclosure describes a vehicle responding to detections of misbehavior in a connected vehicle; one of the vehicles 110 will be described from the perspective of receiving a V2X message, determining a misbehavior based on the message, and responding to the misbehavior. This vehicle 110 will be referred to herein as the "ego vehicle" 101. For example, in these figures vehicle 110-1 is referred to as the ego vehicle 101. As such, vehicle 110-1 is referred to in many of the examples below as the vehicle receiving a V2X message, determining a misbehavior in the message, and responding. It is noted, the disclosure is not limited in this manner and any vehicle 110 can be arranged to operate as ego vehicle 101. However, for convenience of description, the vehicle 110-1 is referenced as the ego vehicle.

Another one of vehicles 110 will be referred to as the "misbehaving vehicle" 103. For example, FIG. 1A depicts vehicle 110-2 as the misbehaving vehicle while FIG. 1B depicts the vehicle 110-7 as the misbehaving vehicle. It is noted that any one of vehicles 110 can be a misbehaving vehicle 103. That is, ego vehicle 101 could receive a V2X message from any one of the other vehicle 110 and can determine that the vehicle sending the V2X message is misbehaving based on the received V2X message. However, for convenience of description, some examples, refer to vehicle 110-2 as the misbehaving vehicle 103 while other examples refer to vehicle 110-7 as the misbehaving vehicle 103. It is noted that some examples clarify which vehicle 110 is the misbehaving vehicle 103 while others do not. However, in most examples, either vehicle 110-2 and/or 110-7 can be the misbehaving vehicle 103.

During operation, ego vehicle 101 can send a misbehavior report (MBR) to a misbehavior authority (MA) responsive to determining a misbehavior with misbehaving vehicle 103. In some examples, RSU 130 can operate as the misbehavior authority while in other examples, RSU 130 can be a node arranged to transmit MBRs to a MA in the cloud. In general, a MA is arranged to investigate the MBRs and revoke the certificate(s) associated with a compromised vehicle. However, this process takes a significant amount of time. For example, in many conventional implementations, the MA may update revocation list of invalid certificates on a weekly basis. This "gap" between when the MA takes action on a misbehavior report and when a misbehavior is detected and reported is significant and leaves open a number of attack vectors and introduces a number of safety issues.

The present disclosure provides an ego vehicle 110 arranged to adjust driving policy and crowd source more evidence related to the misbehavior during this "gap", before the misbehaving vehicle is formally revoked by the MA in the V2X network as a whole. This can be in addition to transmitting an MBR to the MA. As such, ego vehicle can be arranged to respond immediately or significantly quicker than the MA to mitigate safety issues locally related to the misbehavior. Examples response (or actions) ego vehicle 101 can take, responsive to the detected misbehavior, are described in greater detail below.

Figure 2:
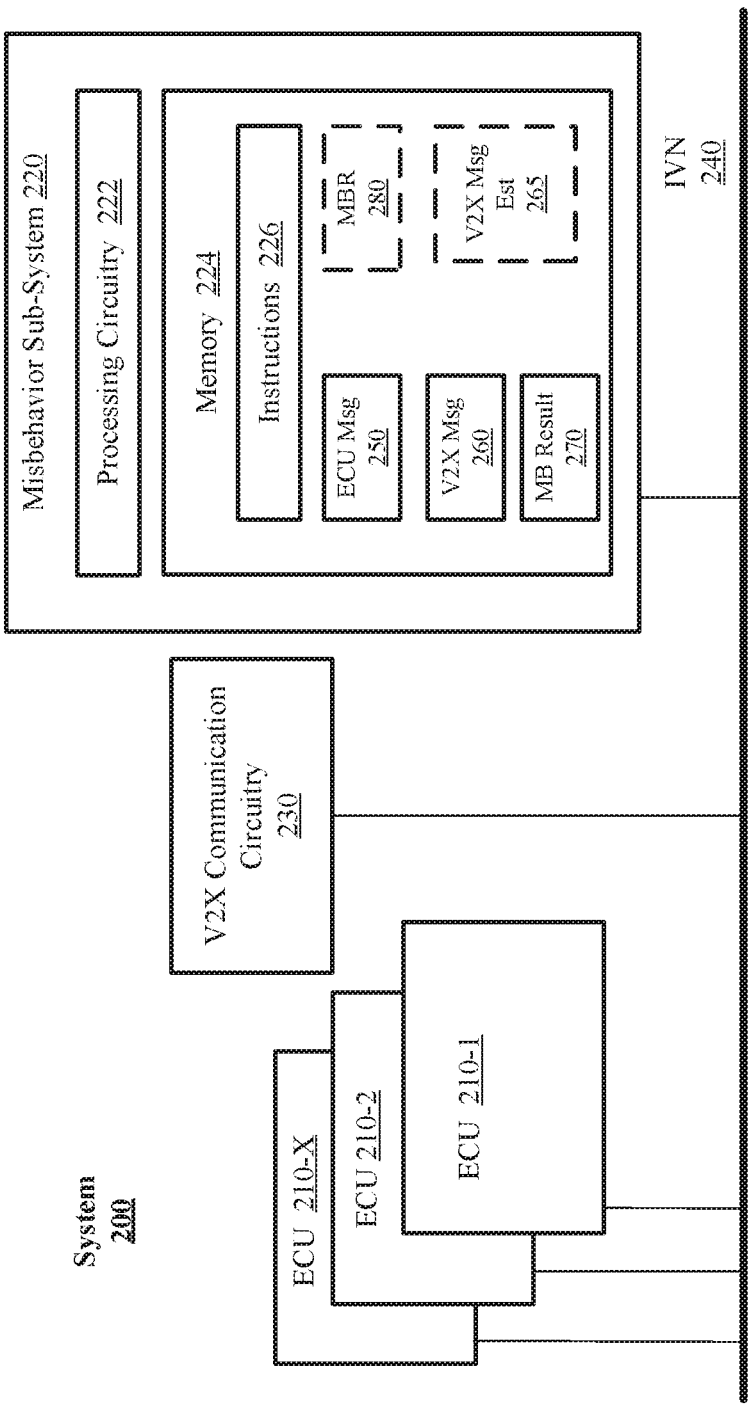
FIG. 2 illustrates a system for a vehicle.

FIG. 2 illustrates a system 200 that can be implemented in ego vehicle 101 of system 100 of FIGS. 1A-1B. System 200 includes a number of electronic control units (ECUs) 210, a misbehavior sub-system 220, and V2X communication circuitry 230. For example, ECUs 210-1, 210-2 through 210-X are depicted, where X is a positive integer. ECUs 210, misbehavior sub-system 220, and V2X communication circuitry 230 can be coupled via an in-vehicle network (IVN) 240. In some examples, IVN 240 can be a CAN bus, a FlexRay bus, a CAN FD bus, an automotive ethernet bus, or a local interconnected network (LIN) bus, or the like.

It is noted that system 200 can be implemented in any one or more of vehicles 110 of system 100. However, examples herein refer to vehicle 110-1, as the ego vehicle 101, having a system like system 200 implemented therein. In general, ECUs 210 include circuitry arranged to generate and/or consume ECU messages 250. ECU messages 250 are communicated via IVN 240 and can include indications of data (e.g., sensor data, or the like) or commands (e.g., actuator commands, or the like). It is noted, ECUs 210 can be any of a variety of electronic components of vehicle 110, such as, sensors, actuators, controllers, telecommunications, infotainment, etc. Examples are not limited in this context.

Likewise, V2X communication circuitry 230 can be arranged to transmit or receive information elements including indications of V2X messages 260. For example, V2X communication circuitry 230 can receive, via V2X network 140, V2X message 260 from misbehaving vehicle 103. As another example, V2X communication circuitry 230 can transmit a V2X message 260 over V2X network 140.

Misbehavior sub-system 220 can include processing circuitry 220 and memory 224. Where memory 224 includes instructions 226 executable by processing circuitry 222, which when executed cause processing circuitry 222 to determine a misbehavior result 270 of V2X message 260 received from misbehaving vehicle 103. Furthermore, instructions 226 when executed by processing circuitry 222 cause the processing circuitry 222 to respond to the misbehavior result 270 as detailed herein.

For example, mis-behavior subsystem 220 can score the misbehavior of misbehaving vehicle 103. Said differently, misbehavior result 270 can include scores (see FIG. 3) while processing circuitry 222, in executing instructions 226, can initiate a response flow based on the scores. In some examples, mis-behavior sub-system 220 can generate both a confidence score and a trust score and can initiate a response flow based on whether the confidence and/or trust score are above threshold values. Example response flows are described in greater detail below (e.g., FIGS. 5-9). However, in general, the response flows can include sending a MBR 280 to a MA, sending an updated MBR 280 to the MA, discarding the V2X message, generating a V2X message estimate 265 comprising an estimate of the data associated with the V2X message 260 using alternative and/or independent sources and adjusting ego vehicle 101 operation based on the estimated data.

Figure 3:
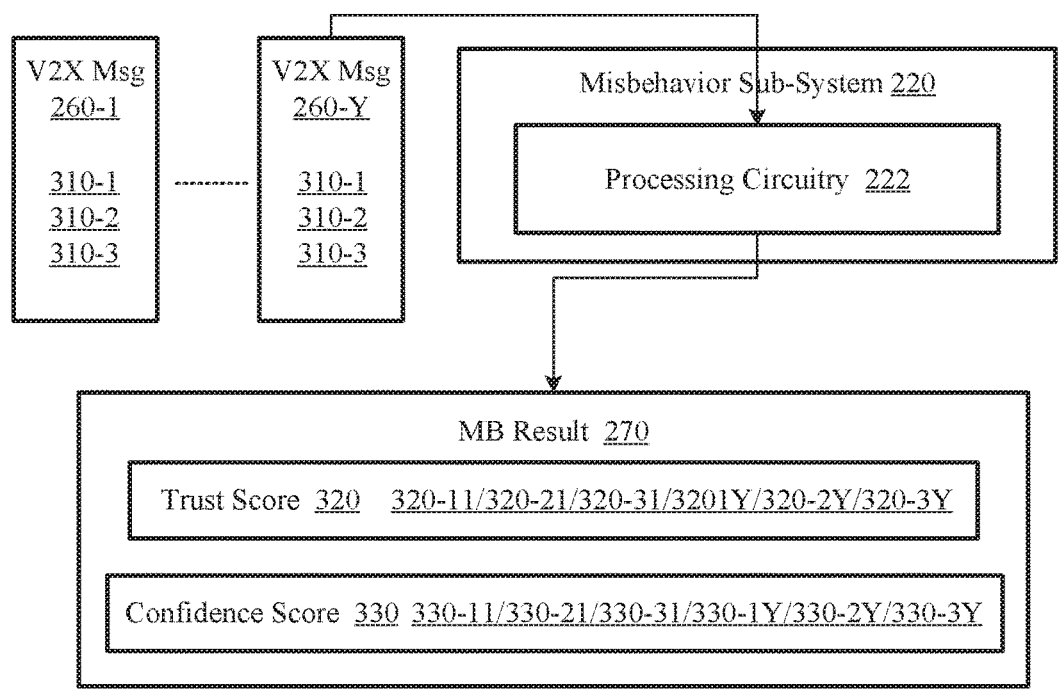
FIG. 3 illustrates the system of FIG. 2 in alternative detail.

FIG. 3 illustrates the system 200 of FIG. 2 in alternative detail. In particular, this figure illustrates processing circuitry 222 of misbehavior sub-system 220 receiving V2X message 260 and generating MB result 270. For example, processing circuitry 222 in executing instructions 226 can apply a misbehavior detection scheme (e.g., machine learning model, algorithm, or the like) arranged to identify misbehavior with respect to the V2X message 260.

It is noted that the present disclosure can be implemented independently from any particular misbehavior scheme. However, in general, misbehavior schemes (e.g. algorithms, models, etc.) involve a series of tests to check the plausibility and consistency of data in a single V2X message 260, across multiple V2X messages 260, or across multiple senders (e.g., vehicles 110, RSU 130, etc.) of V2X messages 260.

Here, processing circuitry 222 can execute instructions (including a misbehavior detection scheme) to receive as input a time series of V2X messages (e.g., V2X message 260-1 to 260-Y, where Y is a positive integer) from neighboring vehicles 110. Each V2X message 260 can include indications of one or more data fields 310. For example, V2X messages 260 are depicted including indications of data fields 310-1, 310-2, and 310-3. It is noted that V2X messages 260 can include indications of any number of data fields. Additionally, the data fields can correspond to any number of semantic descriptions of the sending vehicle 110 (e.g., position, speed, acceleration, etc.).

Processing circuitry 222 in executing instructions 226 can receive the time series of V2X messages 260 and can generate a misbehavior report including a trust score 320 and a confidence score 330. In some examples, the trust score 320 and confidence score 330 can be generated for each data field 310-1 of each V2X message 260. For example, trust score 320 is depicted including trust scores 320-11, 320-21, 320-31, 320-1Y, 320-2Y, and 320-3Y for the data fields 310 of V2X messages 260. Likewise, confidence score 330 is depicted including confidence scores 330-11, 330-21, 330-31, 330-1Y, 330-2Y, and 330-3Y for the data fields 310 of V2X messages 260. Although trust scores 320 and confidence scores 330 are depicted for individual data fields 310 in a V2X message 260, scores 320 and 330 can be generated for an entire V2X message 260 as opposed to for each data field 310 in the V2X message 260.

As noted, the present disclosure can be implemented independently from the underlying misbehavior detection scheme. However, discussion of trust scores 320 and confidence scores 330 generally is helpful to the discussion. In general, trust scores 320 and confidence scores 330 can take any format. In most examples, trust score 320 and confidence score 330 may be a value greater than or equal to zero (0). With some examples, trust scores 320 and confidence scores 330 can have a value between 0 and 1. For example, processing circuitry 222 in executing instructions 226 can normalize the trust and confidence scores generated by the underlying misbehavior scheme to between 0 and 1. Furthermore, in general trust scores 320 reflect the "trustworthiness" or value between 0 and 1 of how reasonable it is to question the correctness of the V2X message 260 (or data fields 310). For example, a trust score 320 of 0 implies that the V2X message 260 (or data fields 310) are incorrect while a trust score 320 of 1 implies that the V2X message 260 (or data fields 310) checks out where trust scores 320 between 0 and 1 reflect inconsistencies in the evidence proving or disproving the V2X message 260 (or data fields 310).

Additionally, in general confidence scores 330 reflect how "confident" the scheme is about the trust score 320. For example, confidence scores can be based on how many independent sources of evidence point to the same trust score or how many different test has been passed or failed. In some examples, where no misbehavior detection test has been applied to a V2X message 260 (or data fields 310) a confidence score 330 of 0 should be applied.

Figure 4:
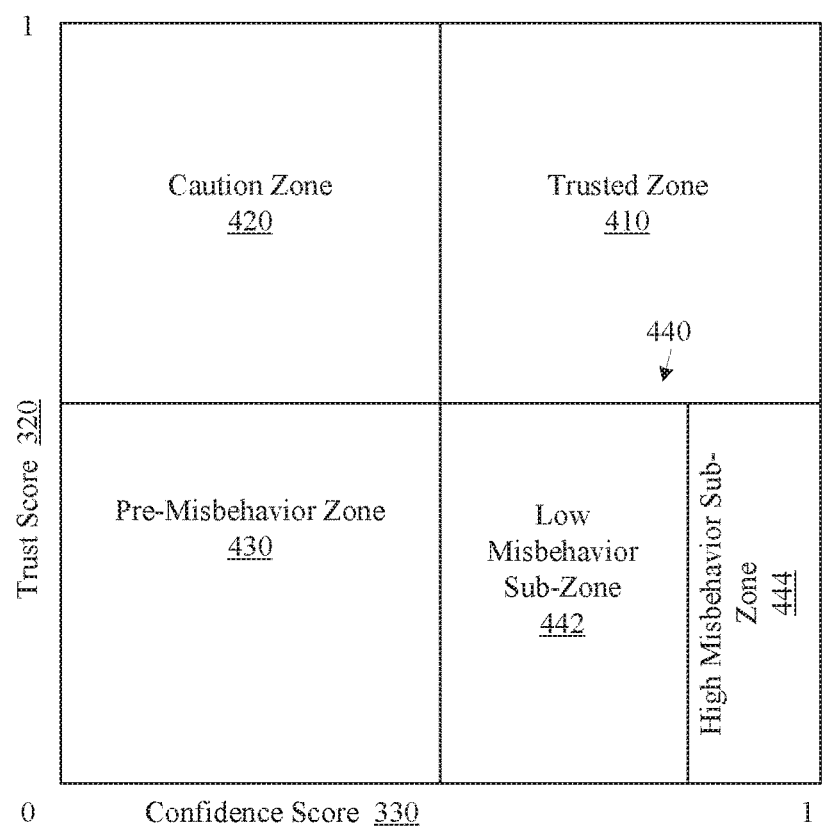
FIG. 4 illustrates a matrix of misbehavior response zones.

Given the trust scores 320 and confidence scores 330, the ego vehicle 101 can respond based on a "zone" within which the trust score 320 and confidence score 330 place the V2X message 260 (or data fields 310). For example, FIG. 4 illustrates a matrix 400 depicting response zones for an ego vehicle. In general, an ego vehicle can response to a V2X message 260 based on the trust score 320 and confidence score 330. For example, in some instances, a matrix or grid of zones can be formed by plotting the trust score 320 on one axis and the confidence score 330 on the other axis. Threshold values can be used to delineate between zones. For example, a threshold value of 0.5 for the trust score 320 and 0.5 for the confidence score 330 can be used to delineate four (4) separate zones. For example, a trust score 320 above 0.5 and a confidence score 330 above 0.5 can be designated as the trusted zone 410. Likewise, a trust score 320 above 0.5 but a confidence score 330 below 0.5 can be designated as the caution zone 420. Similarly, a trust score 320 below 0.5 and a confidence score 330 below 0.5 can be designated as the pre-misbehavior zone 430.

Lastly, a trust score 320 below 0.5 but a confidence score 330 above 0.5 can be designated as the misbehavior zone 440. In some examples, the misbehavior zone itself can be split into multiple sub-zones. For example, a low misbehavior sub-zone 442 can be designated where the trust score 320 is below the first threshold value (e.g., 0.5) and the confidence score is between the second threshold value (e.g., 0.5) and a third threshold value (e.g., 0.8, or the like). Likewise, a high misbehavior sub-zone 444 can be designated where the trust score 320 is below the first threshold value (e.g., 0.5) and the confidence score is above the third threshold value (e.g., 0.8, or the like) and as a result, also above the second threshold value (e.g., 0.5).

It is noted that the threshold values indicated in the examples above are given for purposes of example only. In practice, the threshold values can be set as values that provide the intended response in the ego vehicle 101. For example, where more caution is desired, the threshold values associated with the trust score can be increased to reduce the size of the trusted zone, thereby increasing the number of V2X messages 260 (or data fields 310) within which the ego vehicle responds (e.g., by applying the monitoring and feedback loops discussed below, or the like).

Figure 5:
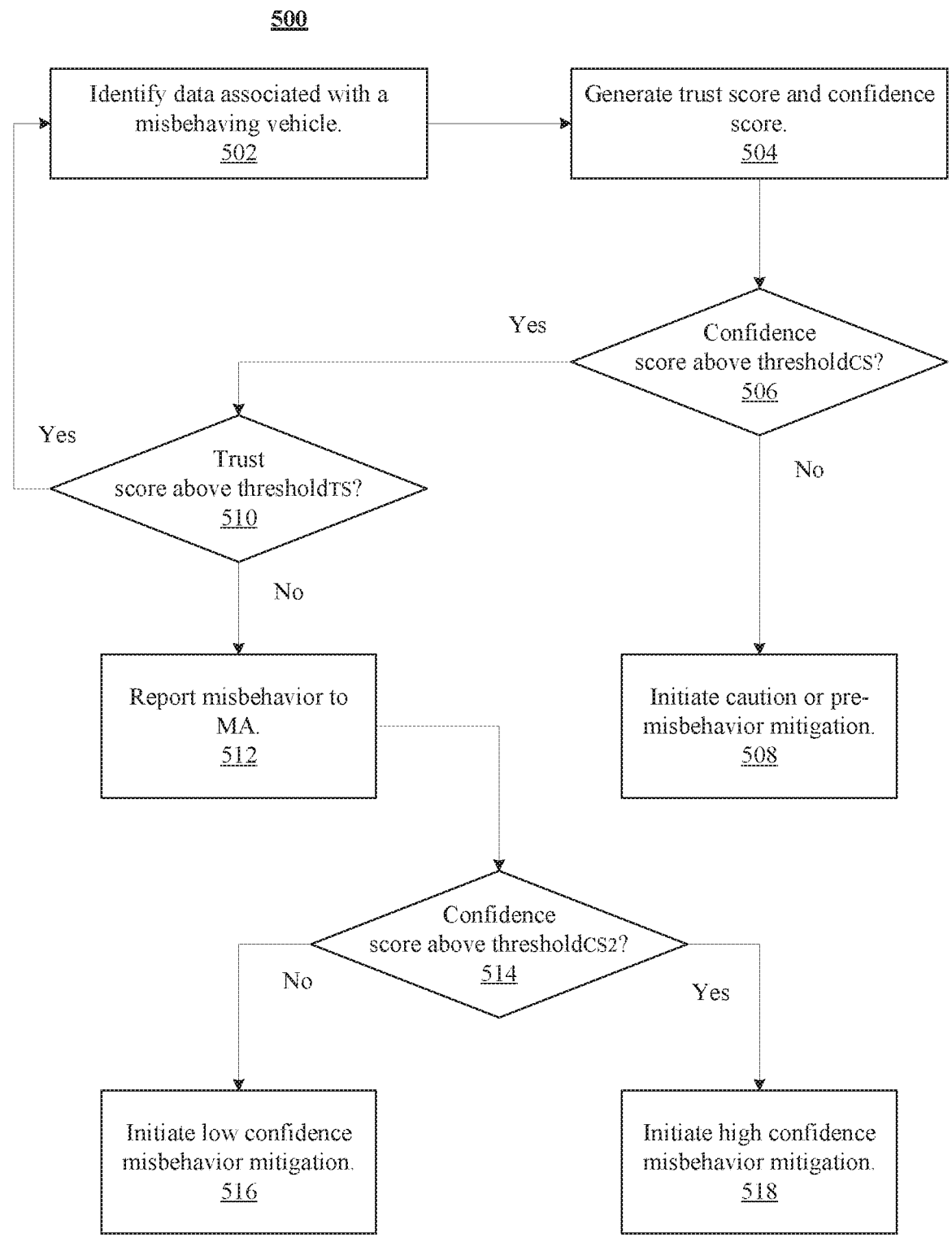
FIG. 5 illustrates a flow diagram for detecting a misbehavior and initiating a response.

FIG. 5 illustrates an example flow diagram 500 for detecting a misbehavior and initiating a response, according to embodiments of the present disclosure. It may be understood that the features described in each block may be executed by processing circuitry, such as, processing circuitry of an ego vehicle (e.g., ego vehicle 101, or the like). Further, it may be understood that the blocks are not required to be performed in any specific order and some blocks can be omitted in some embodiments.

At block 502, data associated with a misbehaving vehicle may be identified. For example, misbehavior sub-system 220 can identify data (e.g., data fields 310, or the like) associated with misbehaving vehicle 103. As a specific example, processing circuitry 222 in executing instructions 226 can determine that V2X message 260 (or data fields 310) failed or is flagged as misbehaving by a misbehavior detection scheme.

At block 504, a trust score and a confidence score can be generated. For example, processing circuitry 222 in executing instructions 226 can score the misbehavior. As a specific example, processing circuitry 222 in executing instructions 226 can generate a trust score 320 and a confidence score 330 for the V2X message 260 (or data fields 310).

Continuing to decision block 506, it is determined whether the confidence score 330 is above a threshold value associated with the confidence score 330 (threshold$_{CS}$). From decision block 506 logic flow 500 can continue to either block 508 or decision block 510. For example, the logic flow 500 can continue to block 508 based on a determination that the confidence score 330 is less than (or less than or equal to) the threshold$_{CS}$ while the logic flow 500 can continue to decision block 510 based on a determination that the confidence score 330 is greater than (or greater than or equal to) the threshold$_{CS}$.

At block 508, caution or pre-misbehavior response can be initiated. Said differently, the ego vehicle 101 can initiate caution or pre-misbehavior mitigation flows (e.g., refer to FIG. 9). For example, processing circuitry 222 in executing instructions 226 can initiate logic flows corresponding to a caution or pre-misbehavior mitigation.

At decision block 510, it is determined whether the trust score 320 is above a threshold value associated with the trust score 320 (threshold$_{TS}$). From decision block 510 logic flow 500 can continue to either block 512 or return to block 502. For example, the logic flow 500 can continue to block 512 based on a determination that the trust score 320 is less than (or less than or equal to) the threshold$_{TS}$ while the logic flow 500 can return to block 502 based on a determination that the trust score 320 is greater than (or greater than or equal to) the threshold$_{TS}$.

At block 512, report misbehavior to MA, the ego vehicle can report the misbehavior to the MA. For example, processing circuitry 222 in executing instructions 226 can transmit MBR 280 via V2X network 140 to the MA. Continuing to decision block 514, it is determined whether the confidence score 320 is above a second threshold value associated with the confidence score 330 (threshold$_{CS2}$). From decision block 514 logic flow 500 can continue to either block 516 or block 518. For example, the logic flow 500 can continue to block 516 based on a determination that the confidence score 330 is less than (or less than or equal to) the threshold$_{CS2}$ while the logic flow 500 can continue to block 518 based on a determination that the confidence score 330 is greater than (or greater than or equal to) the threshold$_{CS2}$.

At block 516, a low confidence misbehavior response can be initiated. Said differently, the ego vehicle 101 can initiate low confidence misbehavior mitigation flows (e.g., refer to FIG. 7). For example, processing circuitry 222 in executing instructions 226 can initiate logic flows corresponding to a low confidence misbehavior mitigation.

At block 518, a high confidence misbehavior response can be initiated. Said differently, the ego vehicle 101 can initiate high confidence misbehavior mitigation flows (e.g., refer to FIG. 6). For example, processing circuitry 222 in executing instructions 226 can initiate logic flows corresponding to a high confidence misbehavior mitigation.

Figure 6:
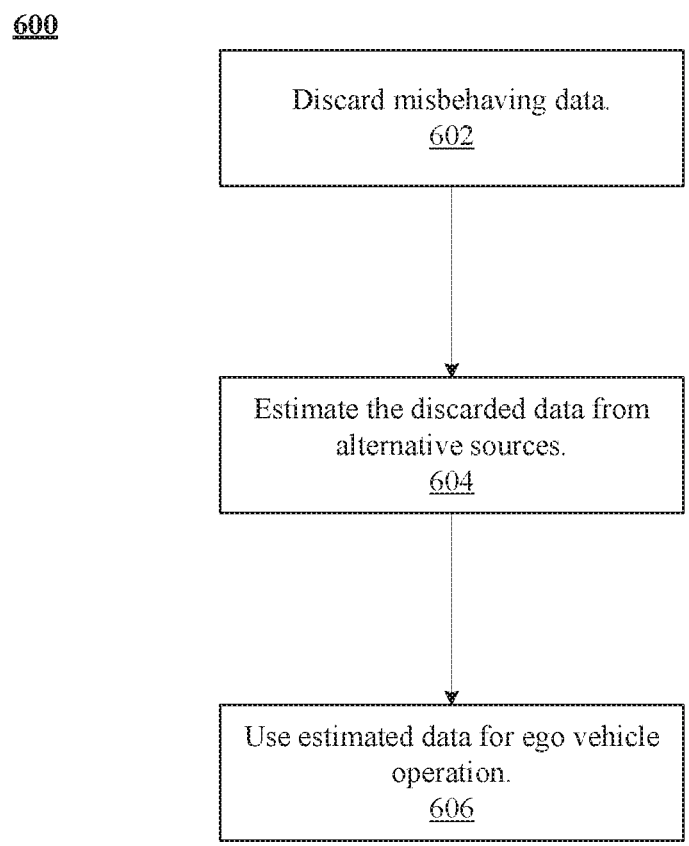
FIG. 6 illustrates a flow diagram for responding to a misbehavior in the high confidence misbehavior zone.

FIG. 6 illustrates an example flow diagram 600 for responding to a misbehavior in the high confidence misbehavior zone, according to embodiments of the present disclosure. It may be understood that the features described in each block may be executed by processing circuitry, such as, processing circuitry of an ego vehicle (e.g., ego vehicle 101, or the like). Further, it may be understood that the blocks are not required to be performed in any specific order and some blocks can be omitted in some embodiments.

At block 602, misbehaving data may be discarded. For example, ego vehicle 101 (e.g., processing circuitry 222 in executing instructions 226, or the like) can discard the V2X message 260 associated with the misbehavior. As another example, ego vehicle 101 (e.g., processing circuitry 222 in executing instructions 226, or the like) can discard the specific data fields 310 associated with the misbehavior. As a specific example, where data field 310-1 (e.g., indicting speed of the misbehaving vehicle) is in the high misbehavior zone 444 while other data fields 310 from the same V2X message 260 are outside zone 444, then only the data field (e.g., speed) in zone 444 may be discarded.

Continuing to block 604, the discarded data can be estimated from alternative sources. For example, ego vehicle 101 (e.g., processing circuitry 222 in executing instructions 226, or the like) can estimate data fields 310 discarded at block 602 to generate V2X message estimate 265. In some examples, data fields 310 can be estimated from sources of the ego vehicle (e.g., ECU sensors, or the like) while in other examples data fields 310 can be estimated from independent sources (e.g., other vehicles 110 or RSU 130).

Continuing to block 606, use the estimated data for ego vehicle operation. For example, ego vehicle 101 (e.g., processing circuitry 222 in executing instructions 226, or the like) can use the estimated data for operation. As a specific example, ego vehicle 101 can use the estimated data in safety or convenience operation (e.g., lane keeping assist, adaptive cruise control, collision avoidance, or the like).

Figure 7:
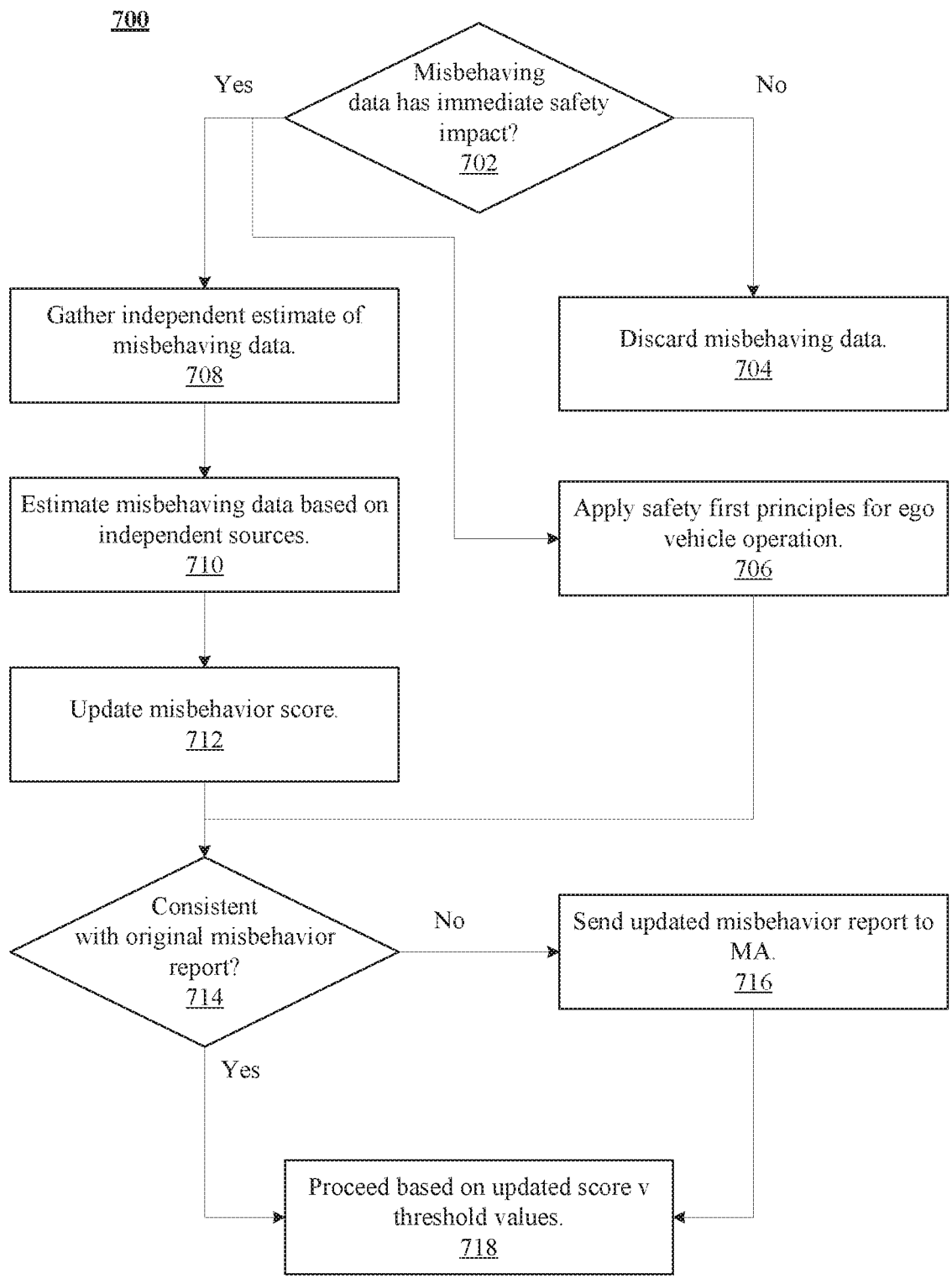
FIG. 7 illustrates a flow diagram for responding to a misbehavior in the low confidence misbehavior zone.

FIG. 7 illustrates an example flow diagram 700 for responding to a misbehavior in the low confidence misbehavior zone, according to embodiments of the present disclosure. It may be understood that the features described in each block may be executed by processing circuitry, such as, processing circuitry of an ego vehicle (e.g., ego vehicle 101, or the like). Further, it may be understood that the blocks are not required to be performed in any specific order and some blocks can be omitted in some embodiments.

At decision block 702, it is determined whether the misbehavior has an immediate safety impact. For example, ego vehicle 101 (e.g., processing circuitry 222 in executing instructions 226, or the like) determines whether the misbehaving vehicle 103 of the data has an immediate safety impact. For example, where the misbehaving vehicle 103 is not proximate to (e.g., neighboring, or the like) the ego vehicle 101, then the misbehavior may not have an immediate safety impact. For example, at decision block 702, ego vehicle 101 can determine whether the misbehaving vehicle is proximate to the ego vehicle 101. From decision block 702 logic flow 700 can continue to either block 704 or to blocks 706 and 708. That is, the logic flow 700 can continue to block 704 based on a determination that there is not an immediate safety impact associated with the misbehavior. As a specific example, ego vehicle 101 can proceed from decision block 702 to block 704 where misbehaving vehicle is vehicle 110-7. Conversely, the logic flow 700 can continue to block 706 and block 708 based on a determination that there is an immediate safety impact associated with the misbehavior. As a specific example, ego vehicle 101 can proceed from decision block 702 to blocks 706 and 708 where misbehaving vehicle is vehicle 110-2.

At block 704, misbehaving data may be discarded. For example, ego vehicle 101 (e.g., processing circuitry 222 in executing instructions 226, or the like) can discard the V2X message 260 associated with the misbehavior. As another example, ego vehicle 101 (e.g., processing circuitry 222 in executing instructions 226, or the like) can discard the specific data fields 310 associated with the misbehavior.

At block 706, a safety first principle can be applied for ego vehicle operation. Said differently, the ego vehicle 101 can operate based on a safety first principle (e.g., refer to FIG. 8). For example, processing circuitry 222 in executing instructions 226 can initiate a safety first operating setting.

At block 708, independent estimates of the misbehaving data can be gathered. For example, ego vehicle 101 (e.g., processing circuitry 222 in executing instructions 226, or the like) can gather independent estimates of the misbehaving data form other vehicles 110 and/or RSU 130 via V2X network 140. Said differently, ego vehicle 101 can pinged (e.g., via V2X network 140, or the like) other vehicles 110 and/or RSU 130 to request estimates of the misbehaving data. As a specific example, ego vehicle 101 can request an estimate of the speed of misbehaving vehicle 103 from RSU 130. As RSU 130 is stationary while ego vehicle 101 and misbehaving vehicle 103 are traveling in the same direction and similar speeds, Doppler frequency shift based speed detection from RSU 130 would be more accurate than estimates of misbehaving vehicle 103 speed done by sensors onboard ego vehicle 101.

Continuing to block 710, the discarded data can be estimated from the independent estimates. For example, ego vehicle 101 (e.g., processing circuitry 222 in executing instructions 226, or the like) can estimate data fields 310 based on estimates from independent sources to generate V2X message estimate 265. Continuing to block 712, the scores for the misbehaving data can be updated. For example, ego vehicle 101 (e.g., processing circuitry 222 in executing instructions 226, or the like) can update the trust score 320 and confidence score 330 for the newly estimated data.

At decision block 714, it is determined whether the new estimate and score is consistent with the misbehavior report (e.g., MBR 280 transmitted to MA at block 512, or the like). From decision block 714 logic flow 700 can continue to either block 716 or block 718. For example, the logic flow 700 can continue to block 716 based on a determination that the original MBR is inconsistent with the new estimate and score while the logic flow 700 can continue to block 718 based on a determination that the that the original MBR is consistent with the new estimate and score.

At block 716, an updated misbehavior report 280 can be transmitted to the MA. For example, processing circuitry 222 in executing instructions 226 can transmit an updated MBR 280 via V2X network 140 to the MA. At block 718, ego vehicle can operation can continue based on the updated score v threshold. For example, where the updated score changes the zone within which the misbehavior is classified, then ego vehicle 101 can change operation based on the new zone. As a specific example, where the updated score places the misbehavior in zone 444 (as opposed to zone 442, or the like) then the high confidence misbehavior mitigation flows (e.g., refer to FIG. 6) can be initiated. As another specific example, where the updated score places the misbehavior in zone 420 or 430 (as opposed to zone 442, or the like) then the caution or pre-misbehavior mitigation flows (e.g., refer to FIG. 9) can be initiated.

Figure 8:
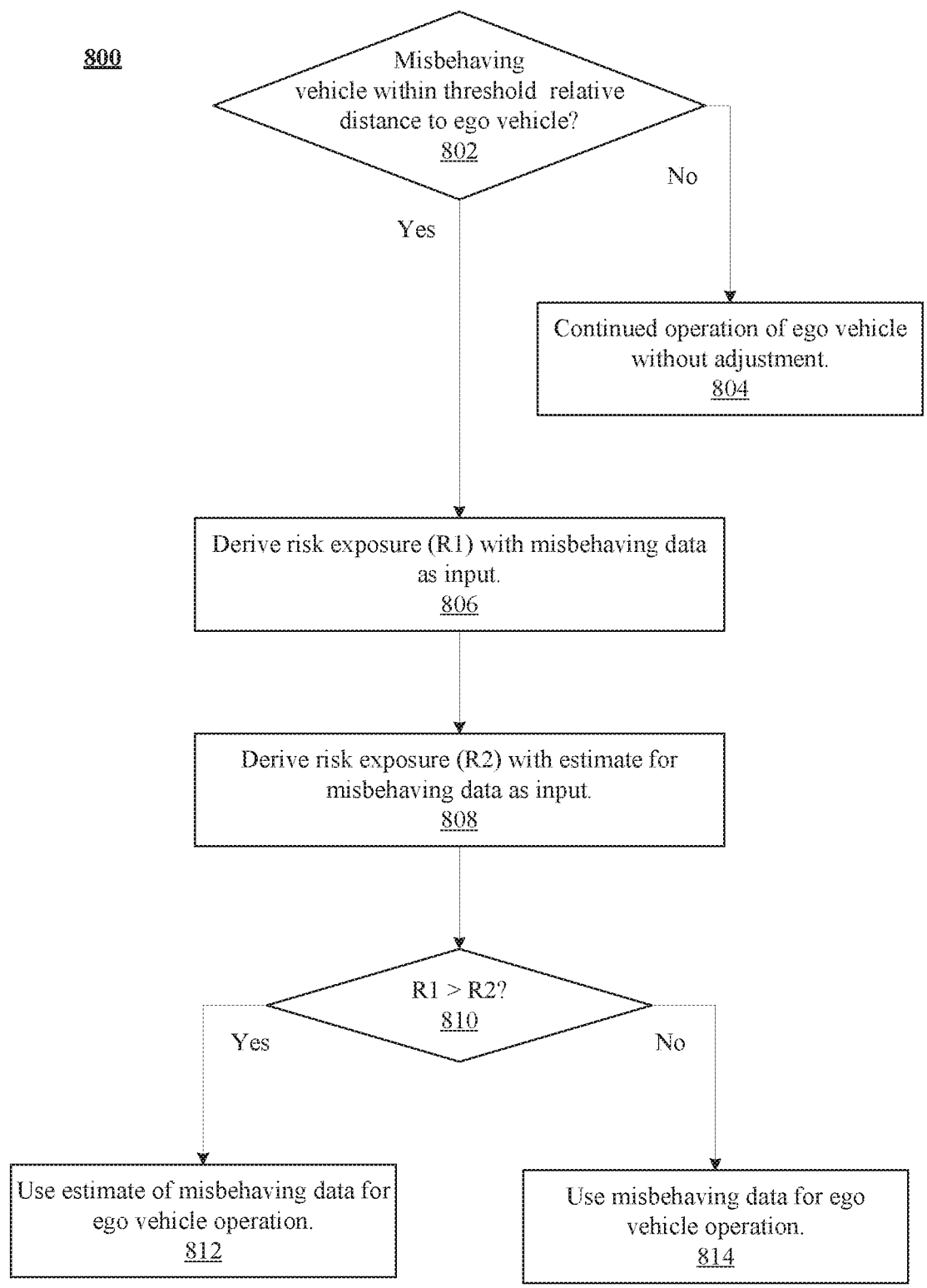
FIG. 8 illustrates a flow diagram for a safety first operation.

FIG. 8 illustrates an example flow diagram 800 for a safety first operation, according to embodiments of the present disclosure. It may be understood that the features described in each block may be executed by processing circuitry, such as, processing circuitry of an ego vehicle (e.g., ego vehicle 101, or the like). Further, it may be understood that the blocks are not required to be performed in any specific order and some blocks can be omitted in some embodiments.

At decision block 802, it is determined whether the misbehaving vehicle is within a threshold relative distance to the ego vehicle. For example, ego vehicle 101 (e.g., processing circuitry 222 in executing instructions 226, or the like) determines whether the misbehaving vehicle 103 is located within a threshold relative distance of the ego vehicle 101. In some examples, the threshold relative distance can be based on the speed of the ego vehicle 101. For example, the threshold relative distance can increase (linearly, exponentially, as a function of, or the like) the speed of the ego vehicle. In other examples, the threshold is a number of vehicles (e.g., neighbor vehicle, 1 or less vehicles between, 2 or less vehicles between, etc.). From decision block 802 logic flow 800 can continue to either block 804 or to block 806. That is, the logic flow 800 can continue to block 804 based on a determination that the misbehaving vehicle with not within the threshold relative distance of the ego vehicle while the logic flow 800 can continue to block 806 based on a determination that the misbehaving vehicle 806 with not within the threshold relative distance of the ego vehicle.

At block 804 ego vehicle can continue operation without adjustment. For example, ego vehicle 101 (e.g., processing circuitry 222 in executing instructions 226) can continue operation of ego vehicle (e.g., collision avoidance systems, adaptative cruise systems, etc.) without adjustment. At block 806 ego vehicle can derive a risk exposure value (R1) with misbehaving data as input. For example, processing circuitry 222 in executing instructions 226 can derive an time to collision (T1) of ego vehicle 101 with the misbehaving vehicle 103 based on the misbehaving data being correct. As a specific example, where misbehaving data is the speed of the misbehaving vehicle 103, processing circuitry 222 in executing instructions 226 can derive the time to collision (T1) between ego vehicle 101 and misbehaving vehicle 103 based on the speed of ego vehicle 101 and the speed of the misbehaving vehicle 103 (e.g., the speed as indicated by the misbehaving vehicle 103 in the V2X message, or the like). Furthermore, processing circuitry 222 in executing instructions 226 can determine the risk exposure value (R1) as $$R1 = \frac{1}{T1}.$$

At block 808 ego vehicle can derive a risk exposure value (R2) with an estimate for the misbehaving data as input. For example, processing circuitry 222 in executing instructions 226 can derive an time to collision (T2) of ego vehicle 101 with the misbehaving vehicle 103 based on an estimate for the misbehaving data. As a specific example, where misbehaving data is the speed of the misbehaving vehicle 103, processing circuitry 222 in executing instructions 226 can derive the time to collision (T2) between ego vehicle 101 and misbehaving vehicle 103 based on the speed of ego vehicle 101 and the estimate of the speed of the misbehaving vehicle 103 (e.g., as estimated based on alternative sources, as estimated based on independent sources, or the like). With some examples, at block 808, ego vehicle 101 can derive an estimate for the misbehaving data (e.g., as described in other sections of the disclosure). Furthermore, processing circuitry 222 in executing instructions 226 can determine the risk exposure value (R2) as $$R2 = \frac{1}{T2}.$$

Continuing to decision block 810, it is determined whether R1>R2. For example, ego vehicle 101 (e.g., processing circuitry 222 in executing instructions 226, or the like) determines whether the first risk exposure value R1 (e.g., where misbehaving data is used as input) is greater than the second risk exposure value R2 (e.g., where the estimate for the misbehaving data is used as input). From decision block 810 logic flow 800 can continue to either block 812 or to block 814. That is, the logic flow 800 can continue to block 812 based on a determination that R1 is greater than R2 (or R1 is greater than or equal to R2) while the logic flow 800 can continue to block 814 based on a determination that R1 is less than R2 (or R1 is less than or equal to R2).

At block 812 ego vehicle 101 can adjust operation based on the estimate for the misbehaving data to increase safety margins with the misbehaving vehicle 103. For example, ego vehicle 101 (e.g., processing circuitry 222 in executing instructions 226) can adjust operation of ego vehicle systems (e.g., collision avoidance systems, adaptative cruise systems, etc.) based on the estimate for the misbehaving data (e.g., where the estimate is used as input to the ego vehicle systems (or the like).

At block 814 ego vehicle 101 can adjust operation based on the misbehaving data to increase safety margins with the misbehaving vehicle 103. For example, ego vehicle 101 (e.g., processing circuitry 222 in executing instructions 226) can adjust operation of ego vehicle systems (e.g., collision avoidance systems, adaptative cruise systems, etc.) based on the misbehaving data (e.g., where the misbehaving data is used as input to the ego vehicle systems (or the like).

Figure 9:
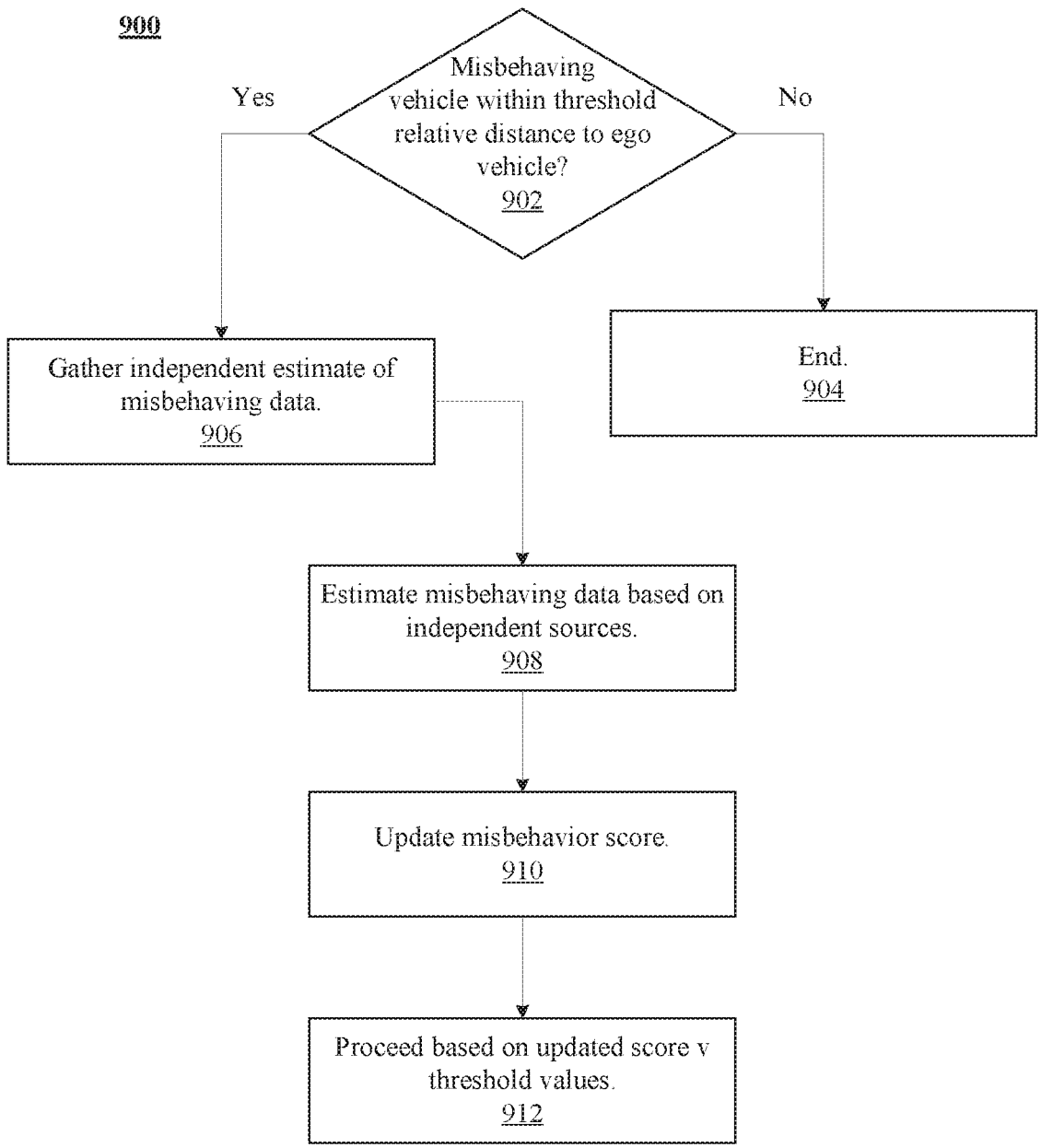
FIG. 9 illustrates a flow diagram for responding to a misbehavior in the caution or pre-misbehavior zones.

FIG. 9 illustrates an example flow diagram 900 for responding to a misbehavior in the caution or pre-misbehavior zones, according to embodiments of the present disclosure. It may be understood that the features described in each block may be executed by processing circuitry, such as, processing circuitry of an ego vehicle (e.g., ego vehicle 101, or the like). Further, it may be understood that the blocks are not required to be performed in any specific order and some blocks can be omitted in some embodiments.

At decision block 902, it is determined whether the misbehaving vehicle is within a threshold relative distance to the ego vehicle. For example, ego vehicle 101 (e.g., processing circuitry 222 in executing instructions 226, or the like) determines whether the misbehaving vehicle 103 is located within a threshold distance of the ego vehicle 101. In some examples, the threshold can be based on the speed of the ego vehicle 101. For example, the distance can increase (linearly, exponentially, as a function of, or the like) the speed of the ego vehicle. In other examples, the threshold is a number of vehicles (e.g., neighbor vehicle, 1 or less vehicles between, 2 or less vehicles between, etc.). From decision block 902 logic flow 900 can continue to either block 904 or to block 906. That is, the logic flow 900 can continue to block 904 based on a determination that the misbehaving vehicle with not within the threshold distance of the ego vehicle while the logic flow 900 can continue to block 906 based on a determination that the misbehaving vehicle with not within the threshold distance of the ego vehicle.

At block 904 logic flow 900 can end. At block 906, independent estimates of the misbehaving data can be gathered. For example, ego vehicle 101 (e.g., processing circuitry 222 in executing instructions 226, or the like) can gather independent estimates of the misbehaving data form other vehicles 110 and/or RSU 130 via V2X network 140. Said differently, ego vehicle 101 can pinged (e.g., via V2X network 140, or the like) other vehicles 110 and/or RSU 130 to request estimates of the misbehaving data. As a specific example, ego vehicle 101 can request an estimate of the speed of misbehaving vehicle 103 from RSU 130. As RSU 130 is stationary while ego vehicle 101 and misbehaving vehicle 103 are traveling in the same direction and similar speeds, Doppler frequency shift based speed detection from RSU 130 would be more accurate than estimates of misbehaving vehicle 103 speed done by sensors onboard ego vehicle 101.

Continuing to block 908, the discarded data can be estimated from the independent estimates. For example, ego vehicle 101 (e.g., processing circuitry 222 in executing instructions 226, or the like) can estimate data fields 310 based on estimates from independent sources to generate V2X message estimate 265. Continuing to block 910, the scores for the misbehaving data can be updated. For example, ego vehicle 101 (e.g., processing circuitry 222 in executing instructions 226, or the like) can update the trust score 320 and confidence score 330 for the newly estimated data.

Continuing to block 912, ego vehicle can operation can continue based on the updated score v threshold. For example, where the updated score changes the zone within which the misbehavior is classified, then ego vehicle 101 can change operation based on the new zone. As a specific example, where the updated score places the misbehavior in zone 444 (as opposed to zones 420 or 430, or the like) then the high confidence misbehavior mitigation flows (e.g., refer to FIG. 6) can be initiated. As another specific example, where the updated score places the misbehavior in zone 442 (as opposed to zones 420 or 430, or the like) then the low confidence misbehavior mitigation flows (e.g., refer to FIG. 7) can be initiated.

Figure 10:
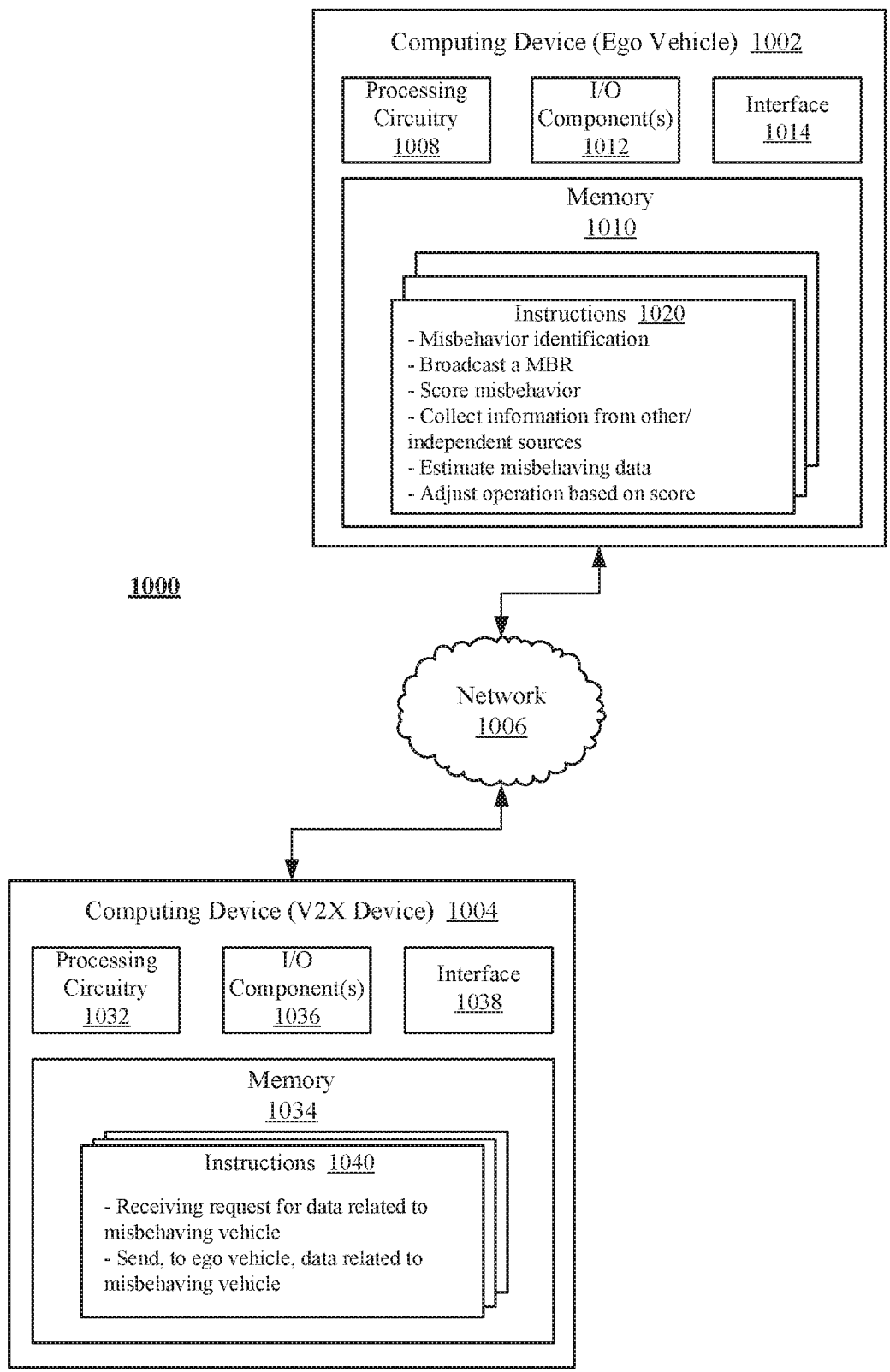
FIG. 10 illustrates a system of computing devices.

FIG. 10 illustrates an example system 1000 for responding to misbehaviors according to embodiments of the present disclosure. As shown, system 1000 includes at least one computing device 1002 implemented at an ego vehicle and at least one computing device 1004 implemented at a V2X device, both of which may be connected to each other via network 1006. Additional (although not shown) computing devices corresponding to other vehicles (e.g., misbehaving vehicle, or the like) may also be connected to the vehicles 1002 and/or 1004 via the network 1006.

Network 1006 could be a local area network (LAN), a wide area network (WAN), or a cellular network (e.g., LTE, 3GPP, or the like). In some embodiments, network 1006 could include the Internet. In other implementations, network 1006 can be an ad-hock network or a peer-to-peer (P2P) network based on one or more V2X standards (e.g., V2V, V2I, or the like).

As illustrated, the computing device 1002 may include processing circuitry (e.g., a processor) 1008, memory 1010, I/O component(s) 1012, and interface 1014. Memory 1010 may store one or more instructions 1020 for responding to misbehaviors detected within the ego vehicle (e.g., computing device 1002). For example, instructions 1020 may include instructions for identifying a misbehavior, generating a MBR indicating the misbehavior and broadcasting the MBR, scoring the misbehavior, collecting information from other/independent sources, estimating the misbehaving data, and adjusting operation of the ego vehicle based on the score. Information in the memory 1010 and other information stored therein may be accessible by or provided to the processing circuitry 1008.

As further illustrated in this figure, the V2X computing device 1004 may include processing circuitry 1032, memory 1034, I/O components 1036, and interface 1038. Similar to memory 1010 of ego vehicle computing device 1002, memory 1034 may store various data or information, such as instructions 1040, for receiving a request for data related to a misbehaving vehicle and sending, to the ego vehicle, data related to the misbehaving vehicle.

The instructions 1020 and data (not shown) stored in memory 1010 may be executable or executed by the processing circuitry 1008. Likewise, the instructions 1040 and data (not shown) stored in memory 1034 may be executable or executed by the processing circuitry 1032. Other information stored in memory 1010 and/or 1034 may also be accessible by or provided to the processing circuitry 1008 or 1032. As illustrated, it may further be understood that multiple sets of instructions 1020 may be included in memory 1010 and multiple sets of instructions 1040 may be included in memory 1034.

According to examples, the processing circuitry 1008 and/or 1032 may include circuitry or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked.

The memories 1010 and/or 1034 may include logic, a portion of which includes arrays of integrated circuits, forming non-volatile memory to persistently store data or a combination of non-volatile memory and volatile memory. It is to be appreciated, that the memories 1010 and/or 1034 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 1012 and/or 1036 may include one or more components to provide input to or to provide output from the computing device 1002 and/or the computing device 1004. For example, the I/O component(s) 1012 and/or 1036 may be a keyboard (hardware, virtual, etc.), mouse, joystick, microphone, track pad, button, touch layers of a display, a heads-up display, haptic feedback device, camera, microphone, speaker, or the like.

Interfaces 1014 and/or 1038 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 914 and/or 938 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Figure 11:
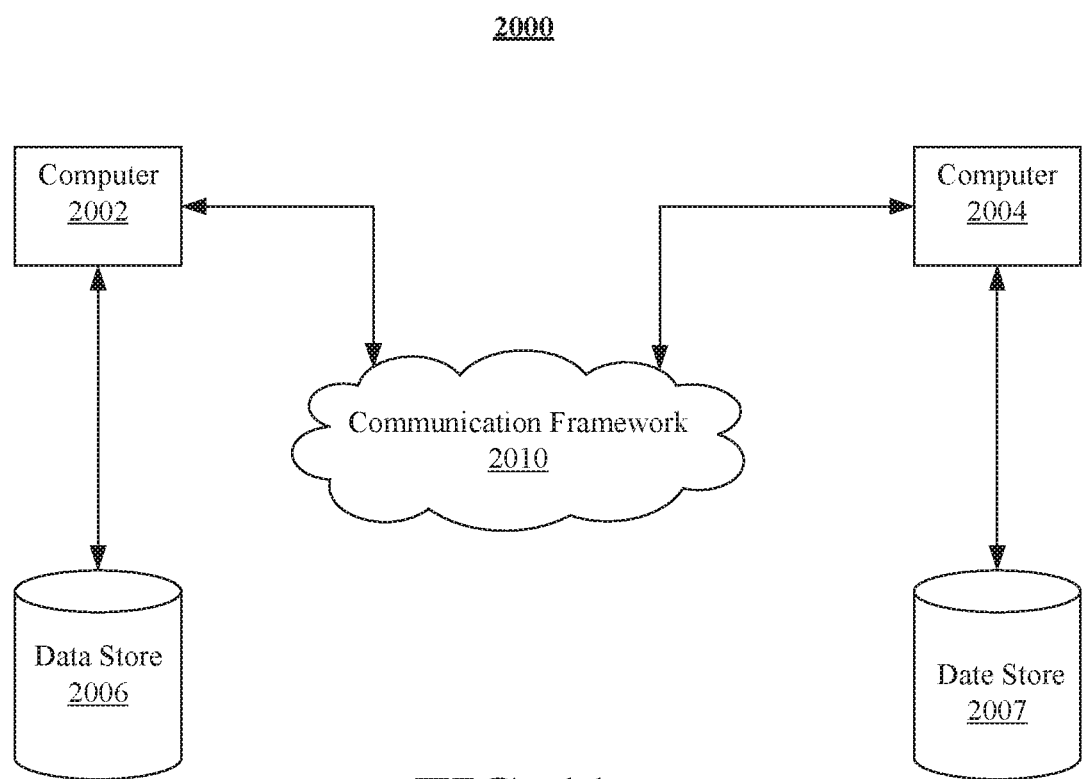
FIG. 11 illustrates an example communications architecture.

FIG. 11 illustrates an exemplary communications architecture 2000 suitable for implementing various embodiments. For example, one or more computing devices may communicate with each other via a communications framework 2010, which may be a network implemented to facilitate V2X communications, for example, to respond to misbehavior as described herein.

The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in this figure, the communications architecture 2000 includes a computer 2002 and a computer 2004, which are operatively connected to one or more respective client data stores 2006 and 2007 that can be employed to store information local to the respective computers 2002 and servers 2004, such as cookies and/or associated contextual information. Furthermore, computers 2002 and 2004 may be like, or include features like, system 200, device 1002, or device 1004.

Computers 2002 and 2004 may communicate information between each other using a communication framework 2010. In one example, computer 2002 may be implemented or configured in an RSU, and further, computer 2004 may be implemented or configured in a vehicle. The communications framework 2010 may implement any well-known communications techniques and protocols. The communications framework 2010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 2002 and 2004. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1

An apparatus for an ego vehicle, comprising: processing circuitry; and memory coupled to the processing circuitry, the memory comprising instructions that when executed by the processing circuitry cause the processing circuitry to: receive a score associated with a vehicle-to-anything (V2X) message received over a V2X network, the score comprising a confidence score and a trust score; determine whether the confidence score is greater than a confidence score threshold; and execute a cautionary pre-misbehavior mitigation instruction set based on a determination that the confidence score is not greater than the confidence score threshold; or determine whether the trust score is greater than a trust score threshold based on a determination that the confidence score is greater than the confidence score threshold; transmit, via the V2X network, a misbehavior report comprising an indication of the misbehavior to a misbehavior authority (MA) based on a determination that the trust score is not greater than the trust score threshold; and execute one or more misbehavior mitigation instruction sets based on the determination that the trust score is not greater than the trust score threshold.

Example 2

The apparatus of example 1, the one or more misbehavior mitigation instruction sets comprising a low confidence misbehavior mitigation instruction set and a high confidence misbehavior mitigation instruction set, the instructions when executed by the processing circuitry cause the processing circuitry to: determine whether the confidence score is greater than a second confidence score threshold, higher than the first confidence score threshold based on the determination that the trust score is not greater than the trust score threshold; and execute the low confidence misbehavior mitigation instruction set routine based on the determination that the confidence score is not greater than the second confidence score threshold; or execute the high confidence misbehavior mitigation instruction set based on the determination that the confidence score is greater than the second confidence score threshold.

Example 3

The apparatus of example 2, the high confidence misbehavior mitigation instruction set, when executed by the processing circuitry cause the processing circuitry to: discard the V2X message; estimate data associated with the discarded V2X message based in part on at least one alternative source of the data; and provide the estimated data as input to at least one control operation of the ego vehicle.

Example 4

The apparatus of example 2, the low confidence misbehavior mitigation instruction set, when executed by the processing circuitry cause the processing circuitry to: determine whether data associated with the V2X message has an immediate safety impact on the ego vehicle; and discard the V2X message based on a determination that the data associated with the V2X message does not have an immediate safety impact on the ego vehicle; or estimate the data associated with the V2X message based in part on at least one independent source of the data based on a determination that the data associated with the V2X message does have an immediate safety impact on the ego vehicle; and execute a safety first instruction set based on the determination that the data associated with the V2X message does have an immediate safety impact on the ego vehicle.

Example 5

The apparatus of example 4, the low confidence misbehavior mitigation instruction set, when executed by the processing circuitry cause the processing circuitry to: send a request, to one or more other vehicles or roadside units via the V2X network, for one or more independent estimates of the data associated with the V2X message based on the determination that the data associated with the V2X message does have an immediate safety impact on the ego vehicle; update the score of the misbehavior of the V2X message based on the one or more independent estimates; determine whether the updated score is consistent with the score; and transmit, via the V2X network, an updated misbehavior report comprising an indication of the misbehavior to the MA based on based on a determination that the updated score is not consistent with the score.

Example 6

The apparatus of example 5, the safety first instruction set, when executed by the processing circuitry cause the processing circuitry to: determine whether a vehicle associated with the V2X message is within a threshold relative distance of the ego vehicle; and adjust at least one parameter of an ego vehicle control system.

Example 7

The apparatus of example 6, the safety first instruction set, when executed by the processing circuitry cause the processing circuitry to: derive a first risk exposure value where the data associated with the V2X message is an input to a risk exposure function; derive a second risk exposure value where the one or more independent estimates of the data associated with the V2X message is an input to a risk exposure function; determine whether the first risk exposure value is greater than the second risk exposure value; and adjust at least one parameter of an ego vehicle control system to account for the data associated with the V2X message based on a determination that the first risk exposure value is greater than the second risk exposure value; or adjust at least one parameter of an ego vehicle control system to account for the one or more data associated with the V2X message based on a determination that the first risk exposure value is greater than the second risk exposure value.

Example 8

The apparatus of example 7, the ego vehicle control system comprising an adaptive cruise control system, a lane keeping assist system, or a collision avoidance system.

Example 9

The apparatus of example 1, the cautionary pre-misbehavior mitigation instruction set, when executed by the processing circuitry cause the processing circuitry to: determine whether a vehicle associated with the V2X message is within a threshold distance of the ego vehicle; estimate the data associated with the V2X message based in part on at least one independent source of the data based on a determination that the vehicle associated with the V2X message is within the threshold distance of the ego vehicle; and update the score of the misbehavior of the V2X message based on the determination that the vehicle associated with the V2X message is within the threshold distance of the ego vehicle.

Example 10

A system for a vehicle, comprising: communication circuitry arranged to receive signals over a vehicle-to-anything (V2X) network; processing circuitry; and memory coupled to the processing circuitry, the memory comprising instructions that when executed by the processing circuitry cause the processing circuitry to: receive, via the signals, a message from a connected vehicle; detect a misbehavior of the message; score the misbehavior, the score comprising a confidence score and a trust score; determine whether the confidence score is greater than a confidence score threshold; and execute a cautionary pre-misbehavior mitigation instruction set based on a determination that the confidence score is not greater than the confidence score threshold; or determine whether the trust score is greater than a trust score threshold based on a determination that the confidence score is greater than the confidence score threshold; transmit, via the communication circuitry, a misbehavior report comprising an indication of the misbehavior to a misbehavior authority (MA) based on based on a determination that the trust score is not greater than the trust score threshold; and execute one or more misbehavior mitigation instruction sets based on the determination that the trust score is not greater than the trust score threshold.

Example 11

The system of example 10, the one or more misbehavior mitigation instruction sets comprising a low confidence misbehavior mitigation instruction set and a high confidence misbehavior mitigation instruction set, the instructions when executed by the processing circuitry cause the processing circuitry to: determine whether the confidence score is greater than a second confidence score threshold, higher than the first confidence score threshold based on the determination that the trust score is not greater than the trust score threshold; and execute the low confidence misbehavior mitigation instruction set routine based on the determination that the confidence score is not greater than the second confidence score threshold; or execute the high confidence misbehavior mitigation instruction set based on the determination that the confidence score is greater than the second confidence score threshold.

Example 12

The system of example 11, the high confidence misbehavior mitigation instruction set, when executed by the processing circuitry cause the processing circuitry to: discard the V2X message; estimate data associated with the discarded V2X message based in part on at least one alternative source of the data; and provide the estimated data as input to at least one control operation of the ego vehicle.

Example 13

The system of example 11, the low confidence misbehavior mitigation instruction set, when executed by the processing circuitry cause the processing circuitry to: determine whether data associated with the V2X message has an immediate safety impact on the ego vehicle; and discard the V2X message based on a determination that the data associated with the V2X message does not have an immediate safety impact on the ego vehicle; or estimate the data associated with the V2X message based in part on at least one independent source of the data based on a determination that the data associated with the V2X message does have an immediate safety impact on the ego vehicle; and execute a safety first instruction set based on the determination that the data associated with the V2X message does have an immediate safety impact on the ego vehicle.

Example 14

The system of example 13, the low confidence misbehavior mitigation instruction set, when executed by the processing circuitry cause the processing circuitry to: send a request, to one or more other vehicles or roadside units via the V2X network, for one or more independent estimates of the data associated with the V2X message based on the determination that the data associated with the V2X message does have an immediate safety impact on the ego vehicle; update the score of the misbehavior of the V2X message based on the one or more independent estimates; determine whether the updated score is consistent with the score; and transmit, via the V2X network, an updated misbehavior report comprising an indication of the misbehavior to the MA based on based on a determination that the updated score is not consistent with the score.

Example 15

The system of example 14, the safety first instruction set, when executed by the processing circuitry cause the processing circuitry to: determine whether a vehicle associated with the V2X message is within a threshold relative distance of the ego vehicle; and adjust at least one parameter of an ego vehicle control system.

Example 16

The system of example 15, the safety first instruction set, when executed by the processing circuitry cause the processing circuitry to: derive a first risk exposure value where the data associated with the V2X message is an input to a risk exposure function; derive a second risk exposure value where the one or more independent estimates of the data associated with the V2X message is an input to a risk exposure function; determine whether the first risk exposure value is greater than the second risk exposure value; and adjust at least one parameter of an ego vehicle control system to account for the data associated with the V2X message based on a determination that the first risk exposure value is greater than the second risk exposure value; or adjust at least one parameter of an ego vehicle control system to account for the one or more data associated with the V2X message based on a determination that the first risk exposure value is greater than the second risk exposure value.

Example 17

The system of example 16, the ego vehicle control system comprising an adaptive cruise control system, a lane keeping assist system, or a collision avoidance system.

Example 18

The system of example 10, the cautionary pre-misbehavior mitigation instruction set, when executed by the processing circuitry cause the processing circuitry to: determine whether a vehicle associated with the V2X message is within a threshold distance of the ego vehicle; estimate the data associated with the V2X message based in part on at least one independent source of the data based on a determination that the vehicle associated with the V2X message is within the threshold distance of the ego vehicle; and update the score of the misbehavior of the V2X message based on the determination that the vehicle associated with the V2X message is within the threshold distance of the ego vehicle.

Example 19

At least one machine-readable storage medium comprising instructions that when executed by at least one processor of an ego vehicle, cause the at least one processor to: score a misbehavior of a vehicle-to-anything (V2X) message received over a V2X network, the score comprising a confidence score and a trust score; determine whether the confidence score is greater than a confidence score threshold; and execute a cautionary pre-misbehavior mitigation instruction set based on a determination that the confidence score is not greater than the confidence score threshold; or determine whether the trust score is greater than a trust score threshold based on a determination that the confidence score is greater than the confidence score threshold; transmit, via the V2X network, a misbehavior report comprising an indication of the misbehavior to a misbehavior authority (MA) based on based on a determination that the trust score is not greater than the trust score threshold; and execute one or more misbehavior mitigation instruction sets based on the determination that the trust score is not greater than the trust score threshold.

Example 20

The at least one machine-readable storage medium of example 19, the one or more misbehavior mitigation instruction sets comprising a low confidence misbehavior mitigation instruction set and a high confidence misbehavior mitigation instruction set, the instructions, when executed, cause the at least one processor to: determine whether the confidence score is greater than a second confidence score threshold, higher than the first confidence score threshold based on the determination that the trust score is not greater than the trust score threshold; and execute the low confidence misbehavior mitigation instruction set routine based on the determination that the confidence score is not greater than the second confidence score threshold; or execute the high confidence misbehavior mitigation instruction set based on the determination that the confidence score is greater than the second confidence score threshold.

Example 21

The at least one machine-readable storage medium of example 20, the high confidence misbehavior mitigation instruction set, when executed cause the at least one processor to: discard the V2X message; estimate data associated with the discarded V2X message based in part on at least one alternative source of the data; and provide the estimated data as input to at least one control operation of the ego vehicle.

Example 22

The at least one machine-readable storage medium of example 20, the low confidence misbehavior mitigation instruction set, when executed cause the at least one processor to: determine whether data associated with the V2X message has an immediate safety impact on the ego vehicle; and discard the V2X message based on a determination that the data associated with the V2X message does not have an immediate safety impact on the ego vehicle; or estimate the data associated with the V2X message based in part on at least one independent source of the data based on a determination that the data associated with the V2X message does have an immediate safety impact on the ego vehicle; and execute a safety first instruction set based on the determination that the data associated with the V2X message does have an immediate safety impact on the ego vehicle.

Example 23

The at least one machine-readable storage medium of example 22, the low confidence misbehavior mitigation instruction set, when executed cause the at least one processor to: send a request, to one or more other vehicles or roadside units via the V2X network, for one or more independent estimates of the data associated with the V2X message based on the determination that the data associated with the V2X message does have an immediate safety impact on the ego vehicle; update the score of the misbehavior of the V2X message based on the one or more independent estimates; determine whether the updated score is consistent with the score; and transmit, via the V2X network, an updated misbehavior report comprising an indication of the misbehavior to the MA based on based on a determination that the updated score is not consistent with the score.

Example 24

The at least one machine-readable storage medium of example 23, the safety first instruction set, when executed cause the at least one processor to: determine whether a vehicle associated with the V2X message is within a threshold relative distance of the ego vehicle; and adjust at least one parameter of an ego vehicle control system.

Example 25

The at least one machine-readable storage medium of example 24, the safety first instruction set, when executed cause the at least one processor to: derive a first risk exposure value where the data associated with the V2X message is an input to a risk exposure function; derive a second risk exposure value where the one or more independent estimates of the data associated with the V2X message is an input to a risk exposure function; determine whether the first risk exposure value is greater than the second risk exposure value; and adjust at least one parameter of an ego vehicle control system to account for the data associated with the V2X message based on a determination that the first risk exposure value is greater than the second risk exposure value; or adjust at least one parameter of an ego vehicle control system to account for the one or more data associated with the V2X message based on a determination that the first risk exposure value is greater than the second risk exposure value.

Example 26

The at least one machine-readable storage medium of example 25, the ego vehicle control system comprising an adaptive cruise control system, a lane keeping assist system, or a collision avoidance system.

Example 27

The at least one machine-readable storage medium of example 19, the cautionary pre-misbehavior mitigation instruction set, when executed cause the at least one processor to: determine whether a vehicle associated with the V2X message is within a threshold distance of the ego vehicle; estimate the data associated with the V2X message based in part on at least one independent source of the data based on a determination that the vehicle associated with the V2X message is within the threshold distance of the ego vehicle; and update the score of the misbehavior of the V2X message based on the determination that the vehicle associated with the V2X message is within the threshold distance of the ego vehicle.

Example 28

A method, comprising: scoring a misbehavior of a vehicle-to-anything (V2X) message received over a V2X network, the score comprising a confidence score and a trust score; determining whether the confidence score is greater than a confidence score threshold; and executing a cautionary pre-misbehavior mitigation instruction set based on a determination that the confidence score is not greater than the confidence score threshold; or determining whether the trust score is greater than a trust score threshold based on a determination that the confidence score is greater than the confidence score threshold; transmitting, via the V2X network, a misbehavior report comprising an indication of the misbehavior to a misbehavior authority (MA) based on based on a determination that the trust score is not greater than the trust score threshold; and executing, via processing circuitry, one or more misbehavior mitigation instruction sets based on the determination that the trust score is not greater than the trust score threshold.

Example 29

The method of example 28, the one or more misbehavior mitigation instruction sets comprising a low confidence misbehavior mitigation instruction set and a high confidence misbehavior mitigation instruction set, the method comprising: determining whether the confidence score is greater than a second confidence score threshold higher than the first confidence score threshold based on based on the determination that the trust score is not greater than the trust score threshold; and executing, via the processing circuitry, the low confidence misbehavior mitigation instruction set routine based on the determination that the confidence score is not greater than the second confidence score threshold; or executing, via the processing circuitry, the high confidence misbehavior mitigation instruction set based on the determination that the confidence score is greater than the second confidence score threshold.

Example 30

The method of example 29, executing, via the processing circuitry, the high confidence misbehavior mitigation instruction comprising: discarding the V2X message; estimating data associated with the V2X message based in part on at least one alternative source of the data; and providing the estimated data as input to at least one control operation of the ego vehicle.

Example 31

The method of example 29, executing, via the processing circuitry, the low confidence misbehavior mitigation instruction comprising: determining whether data associated with the V2X message has an immediate safety impact on the ego vehicle; and discarding the V2X message based on a determination that the data associated with the V2X message does not have an immediate safety impact on the ego vehicle; or estimating the data associated with the V2X message based in part on at least one independent source of the data based on a determination that the data associated with the V2X message does have an immediate safety impact on the ego vehicle; and executing, via the processing circuitry, a safety first instruction set based on the determination that the data associated with the V2X message does have an immediate safety impact on the ego vehicle.

Example 32

The method of example 31, executing, via the processing circuitry, the low confidence misbehavior mitigation instruction comprising: sending a request, to one or more other vehicles or roadside units via the V2X network, for one or more independent estimates of the data associated with the V2X message based on the determination that the data associated with the V2X message does have an immediate safety impact on the ego vehicle; updating the score of the misbehavior of the V2X message based on the one or more independent estimates; determining whether the updated score is consistent with the score; and transmitting, via the V2X network, an updated misbehavior report comprising an indication of the misbehavior to the MA based on based on a determination that the updated score is not consistent with the score.

Example 33

The method of example 32, executing, via the processing circuitry, the safety first instruction set comprising: determining whether a vehicle associated with the V2X message is within a threshold relative distance of the ego vehicle; and adjusting at least one parameter of an ego vehicle control system.

Example 34

The method of example 33, executing, via the processing circuitry, the safety first instruction set comprising: deriving a first risk exposure value where the data associated with the V2X message is an input to a risk exposure function; deriving a second risk exposure value where the one or more independent estimates of the data associated with the V2X message is an input to a risk exposure function; determining whether the first risk exposure value is greater than the second risk exposure value; and adjusting at least one parameter of an ego vehicle control system to account for the data associated with the V2X message based on a determination that the first risk exposure value is greater than the second risk exposure value; or adjusting at least one parameter of an ego vehicle control system to account for the one or more data associated with the V2X message based on a determination that the first risk exposure value is greater than the second risk exposure value.

Example 35

The method of example 34, the ego vehicle control system comprising an adaptive cruise control system, a lane keeping assist system, or a collision avoidance system.

Example 36

The method of example 28, executing, via the processing circuitry, the cautionary pre-misbehavior mitigation instruction set comprising: determining whether a vehicle associated with the V2X message is within a threshold distance of the ego vehicle; estimating the data associated with the V2X message based in part on at least one independent source of the data based on a determination that the vehicle associated with the V2X message is within the threshold distance of the ego vehicle; and updating the score of the misbehavior of the V2X message based on the determination that the vehicle associated with the V2X message is within the threshold distance of the ego vehicle.

Example 37

An apparatus, comprising means arranged to implement the function of any one of examples 28 to 36.

What is claimed is:
1. An apparatus for an ego vehicle, comprising:
processing circuitry; and
memory coupled to the processing circuitry, the memory comprising instructions that when executed by the processing circuitry cause the processing circuitry to:
receive a score associated with a vehicle-to-anything (V2X) message received over a V2X network, the score comprising a confidence score and a trust score, the trust score to comprise a value that represents a level of trust that at least a portion of the V2X message is correct, and the confidence score to comprise a value that represents a level of confidence in the trust score;
determine whether the confidence score is greater than a confidence score threshold; and
execute a cautionary pre-misbehavior mitigation instruction set based on a determination that the confidence score is not greater than the confidence score threshold; or
determine whether the trust score is greater than a trust score threshold based on a determination that the confidence score is greater than the confidence score threshold;
transmit, via the V2X network, a misbehavior report comprising an indication of the misbehavior to a misbehavior authority (MA) based on a determination that the trust score is not greater than the trust score threshold; and
execute one or more misbehavior mitigation instruction sets based on the determination that the trust score is not greater than the trust score threshold.
2. The apparatus of claim 1, wherein the one or more misbehavior mitigation instruction sets comprising a low confidence misbehavior mitigation instruction set and a high confidence misbehavior mitigation instruction set, the instructions when executed by the processing circuitry cause the processing circuitry to:
determine whether the confidence score is greater than a second confidence score threshold, higher than the first confidence score threshold based on the determination that the trust score is not greater than the trust score threshold; and
execute the low confidence misbehavior mitigation instruction set routine based on the determination that the confidence score is not greater than the second confidence score threshold; or
execute the high confidence misbehavior mitigation instruction set based on the determination that the confidence score is greater than the second confidence score threshold.

3. The apparatus of claim 2, wherein the high confidence misbehavior mitigation instruction set, when executed by the processing circuitry cause the processing circuitry to:
discard the V2X message;
estimate data associated with the discarded V2X message based in part on at least one alternative source of the data; and
provide the estimated data as input to at least one control operation of the ego vehicle.

4. The apparatus of claim 2, wherein the low confidence misbehavior mitigation instruction set, when executed by the processing circuitry cause the processing circuitry to:
determine whether data associated with the V2X message has an immediate safety impact on the ego vehicle; and
discard the V2X message based on a determination that the data associated with the V2X message does not have an immediate safety impact on the ego vehicle; or
estimate the data associated with the V2X message based in part on at least one independent source of the data based on a determination that the data associated with the V2X message does have an immediate safety impact on the ego vehicle; and
execute a safety first instruction set based on the determination that the data associated with the V2X message does have an immediate safety impact on the ego vehicle.

5. The apparatus of claim 4, wherein the low confidence misbehavior mitigation instruction set, when executed by the processing circuitry cause the processing circuitry to:
send a request, to one or more other vehicles or roadside units via the V2X network, for one or more independent estimates of the data associated with the V2X message based on the determination that the data associated with the V2X message does have an immediate safety impact on the ego vehicle;
update the score of the misbehavior of the V2X message based on the one or more independent estimates;
determine whether the updated score is consistent with the score; and
transmit, via the V2X network, an updated misbehavior report comprising an indication of the misbehavior to the MA based on based on a determination that the updated score is not consistent with the score.

6. The apparatus of claim 5, wherein the safety first instruction set, when executed by the processing circuitry cause the processing circuitry to:
determine whether a vehicle associated with the V2X message is within a threshold relative distance of the ego vehicle; and
adjust at least one parameter of an ego vehicle control system.

7. The apparatus of claim 6, wherein the safety first instruction set, when executed by the processing circuitry cause the processing circuitry to:
derive a first risk exposure value where the data associated with the V2X message is an input to a risk exposure function;
derive a second risk exposure value where the one or more independent estimates of the data associated with the V2X message is an input to a risk exposure function;
determine whether the first risk exposure value is greater than the second risk exposure value; and
adjust at least one parameter of an ego vehicle control system to account for the data associated with the V2X message based on a determination that the first risk exposure value is greater than the second risk exposure value; or
adjust at least one parameter of an ego vehicle control system to account for the one or more data associated with the V2X message based on a determination that the first risk exposure value is greater than the second risk exposure value.

8. The apparatus of claim 7, wherein the ego vehicle control system comprising an adaptive cruise control system, a lane keeping assist system, or a collision avoidance system.

9. The apparatus of claim 1, wherein the cautionary pre-misbehavior mitigation instruction set, when executed by the processing circuitry cause the processing circuitry to:
determine whether a vehicle associated with the V2X message is within a threshold distance of the ego vehicle;
estimate the data associated with the V2X message based in part on at least one independent source of the data based on a determination that the vehicle associated with the V2X message is within the threshold distance of the ego vehicle; and
update the score of the misbehavior of the V2X message based on the determination that the vehicle associated with the V2X message is within the threshold distance of the ego vehicle.

10. A system for a vehicle, comprising:
communication circuitry for an ego vehicle, arranged to receive signals over a vehicle-to-anything (V2X) network;
processing circuitry; and
memory coupled to the processing circuitry, the memory comprising instructions that when executed by the processing circuitry cause the processing circuitry to:
receive, via the signals, a message from a connected vehicle;
detect a misbehavior of the message;
score the misbehavior, the score comprising a confidence score and a trust score, the trust score to comprise a value that represents a level of trust that at least a portion of the message is correct, and the confidence score to comprise a value that represents a level of confidence in the trust score;
determine whether the confidence score is greater than a confidence score threshold; and
execute a cautionary pre-misbehavior mitigation instruction set based on a determination that the confidence score is not greater than the confidence score threshold; or
determine whether the trust score is greater than a trust score threshold based on a determination that the confidence score is greater than the confidence score threshold;
transmit, via the communication circuitry, a misbehavior report comprising an indication of the misbehavior to a misbehavior authority (MA) based on based on a determination that the trust score is not greater than the trust score threshold; and
execute one or more misbehavior mitigation instruction sets based on the determination that the trust score is not greater than the trust score threshold.

11. The system of claim 10, wherein the one or more misbehavior mitigation instruction sets comprising a low confidence misbehavior mitigation instruction set and a high confidence misbehavior mitigation instruction set, the instructions when executed by the processing circuitry cause the processing circuitry to:
determine whether the confidence score is greater than a second confidence score threshold higher than the first confidence score threshold based on the determination that the trust score is not greater than the trust score threshold; and
execute the low confidence misbehavior mitigation instruction set routine based on the determination that the confidence score is not greater than the second confidence score threshold; or
execute the high confidence misbehavior mitigation instruction set based on the determination that the confidence score is greater than the second confidence score threshold.

12. The system of claim 11, wherein the low confidence misbehavior mitigation instruction set, when executed by the processing circuitry cause the processing circuitry to:
determine whether data associated with the V2X message has an immediate safety impact on the ego vehicle; and
discard the V2X message based on a determination that the data associated with the V2X message does not have an immediate safety impact on the ego vehicle; or
estimate the data associated with the V2X message based in part on at least one independent source of the data based on a determination that the data associated with the V2X message does have an immediate safety impact on the ego vehicle; and
execute a safety first instruction set based on the determination that the data associated with the V2X message does have an immediate safety impact on the ego vehicle;
update the score of the misbehavior of the V2X message based on the determination that the data associated with the V2X message does have an immediate safety impact on the ego vehicle;
determine whether the updated score is consistent with the score; and
transmit, via the V2X network, an updated misbehavior report comprising an indication of the misbehavior to the MA based on based on a determination that the updated score is not consistent with the score.

13. The system of claim 12, wherein the ego vehicle control system comprising an adaptive cruise control system, a lane keeping assist system, or a collision avoidance system.

14. At least one non-transitory machine-readable storage medium comprising instructions that when executed by at least one processor of an ego vehicle, cause the at least one processor to:
score a misbehavior of a vehicle-to-anything (V2X) message received over a V2X network, the score comprising a confidence score and a trust score, the trust score to comprise a value that represents a level of trust that at least a portion of the V2X message is correct, and the confidence score to comprise a value that represents a level of confidence in the trust score;
determine whether the confidence score is greater than a confidence score threshold; and
execute a cautionary pre-misbehavior mitigation instruction set based on a determination that the confidence score is not greater than the confidence score threshold; or
determine whether the trust score is greater than a trust score threshold based on a determination that the confidence score is greater than the confidence score threshold;
transmit, via the V2X network, a misbehavior report comprising an indication of the misbehavior to a misbehavior authority (MA) based on based on a determination that the trust score is not greater than the trust score threshold; and
execute one or more misbehavior mitigation instruction sets based on the determination that the trust score is not greater than the trust score threshold.

15. The at least one non-transitory machine-readable storage medium of claim 14, wherein the one or more misbehavior mitigation instruction sets comprising a low confidence misbehavior mitigation instruction set and a high confidence misbehavior mitigation instruction set, the instructions, when executed, cause the at least one processor to:
determine whether the confidence score is greater than a second confidence score threshold higher than the first confidence score threshold based on based on the determination that the trust score is not greater than the trust score threshold; and
execute the low confidence misbehavior mitigation instruction set routine based on the determination that the confidence score is not greater than the second confidence score threshold; or
execute the high confidence misbehavior mitigation instruction set based on the determination that the confidence score is greater than the second confidence score threshold.

16. The at least one non-transitory machine-readable storage medium of claim 15, wherein the high confidence misbehavior mitigation instruction set, when executed by the at least one processor cause the at least one processor to:
discard the V2X message;
estimate data associated with the V2X message based in part on at least one alternative source of the data; and
provide the estimated data as input to at least one control operation of the ego vehicle.

17. The at least one non-transitory machine-readable storage medium of claim 15, wherein the low confidence misbehavior mitigation instruction set, when executed by the at least one processor cause the at least one processor to:
determine whether data associated with the V2X message has an immediate safety impact on the ego vehicle; and
discard the V2X message based on a determination that the data associated with the V2X message does not have an immediate safety impact on the ego vehicle; or
estimate the data associated with the V2X message based in part on at least one independent source of the data based on a determination that the data associated with the V2X message does have an immediate safety impact on the ego vehicle; and
execute a safety first instruction set based on the determination that the data associated with the V2X message does have an immediate safety impact on the ego vehicle.

18. The at least one non-transitory machine-readable storage medium of claim 17, wherein the low confidence misbehavior mitigation instruction set, when executed by the at least one processor cause the at least one processor to:
update the score of the misbehavior of the V2X message based on the determination that the data associated with the V2X message does have an immediate safety impact on the ego vehicle;
determine whether the updated score is consistent with the score; and
transmit, via the V2X network, an updated misbehavior report comprising an indication of the misbehavior to the MA based on based on a determination that the updated score is not consistent with the score.

19. The at least one non-transitory machine-readable storage medium of claim 18, wherein the safety first instruction set, when executed by the at least one processor cause the processing circuitry to:
  determine whether a vehicle associated with the V2X message is within a threshold distance of the ego vehicle; and
  adjust at least one parameter of an ego vehicle control system.

20. The at least one non-transitory machine-readable storage medium of claim 19, wherein the ego vehicle control system comprising an adaptive cruise control system, a lane keeping assist system, or a collision avoidance system.

21. A method, comprising:
  scoring a misbehavior of a vehicle-to-anything (V2X) message received over a V2X network, the score comprising a confidence score and a trust score, the trust score to comprise a value that represents a level of trust that at least a portion of the V2X message is correct, and the confidence score to comprise a value that represents a level of confidence in the trust score;
  determining whether the confidence score is greater than a confidence score threshold; and
  executing a cautionary pre-misbehavior mitigation instruction set based on a determination that the confidence score is not greater than the confidence score threshold; or
  determining whether the trust score is greater than a trust score threshold based on a determination that the confidence score is greater than the confidence score threshold;
  transmitting, via the V2X network, a misbehavior report comprising an indication of the misbehavior to a misbehavior authority (MA) based on based on a determination that the trust score is not greater than the trust score threshold; and
  executing, via processing circuitry, one or more misbehavior mitigation instruction sets based on the determination that the trust score is not greater than the trust score threshold.

22. The method of claim 21, the one or more misbehavior mitigation instruction sets comprising a low confidence misbehavior mitigation instruction set and a high confidence misbehavior mitigation instruction set, the method comprising:
  determining whether the confidence score is greater than a second confidence score threshold higher than the first confidence score threshold based on the determination that the trust score is not greater than the trust score threshold; and
  executing, via the processing circuitry, the low confidence misbehavior mitigation instruction set routine based on the determination that the confidence score is not greater than the second confidence score threshold; or
  executing, via the processing circuitry, the high confidence misbehavior mitigation instruction set based on the determination that the confidence score is greater than the second confidence score threshold.

23. The method of claim 22, comprising:
  discarding the V2X message;
  estimating data associated with the V2X message based in part on at least one alternative source of the data; and
  providing the estimated data as input to at least one control operation of the ego vehicle.

24. The method of claim 22, comprising:
  determining whether data associated with the V2X message has an immediate safety impact on the ego vehicle; and
  discarding the V2X message based on a determination that the data associated with the V2X message does not have an immediate safety impact on the ego vehicle; or
  estimating the data associated with the V2X message based in part on at least one independent source of the data based on a determination that the data associated with the V2X message does have an immediate safety impact on the ego vehicle; and
  executing, via the processing circuitry, a safety first instruction set based on the determination that the data associated with the V2X message does have an immediate safety impact on the ego vehicle.

25. The method of claim 24, comprising:
  determining whether a vehicle associated with the V2X message is within a threshold distance of the ego vehicle; and
  adjusting at least one parameter of an ego vehicle control system.

* * * * *